United States Patent
Swindells et al.

(10) Patent No.: US 12,293,330 B2
(45) Date of Patent: May 6, 2025

(54) PRODUCT PACKING SYSTEM AND METHOD

(71) Applicant: Express Scripts Strategic Development, Inc., St. Louis, MO (US)

(72) Inventors: Scott Swindells, Chesterfield, MO (US); Gabriel Di Genova, Wildwood, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 220 days.

(21) Appl. No.: 17/973,879

(22) Filed: Oct. 26, 2022

(65) Prior Publication Data

US 2023/0130332 A1 Apr. 27, 2023

Related U.S. Application Data

(60) Provisional application No. 63/272,925, filed on Oct. 28, 2021, provisional application No. 63/272,667, filed on Oct. 27, 2021.

(51) Int. Cl.
*G06Q 10/087* (2023.01)
(52) U.S. Cl.
CPC .................. *G06Q 10/087* (2013.01)
(58) Field of Classification Search
CPC .................................... G06Q 10/087
USPC ......................................... 705/28
See application file for complete search history.

(56) References Cited

U.S. PATENT DOCUMENTS

| | | |
|---|---|---|
| 6,781,522 B2 | 8/2004 | Sleva |
| 6,913,056 B2 | 7/2005 | Landherr |
| 7,006,530 B2 | 2/2006 | Spinar |
| 7,459,054 B2 | 12/2008 | Landherr |
| 7,507,705 B2 | 3/2009 | Buschmann |
| 8,146,642 B2 | 4/2012 | Landherr |
| 8,263,650 B2 | 9/2012 | Cook |
| 8,281,312 B2 | 10/2012 | Gnanasambandam |
| 8,417,550 B2 | 4/2013 | Gabrielson |
| 9,125,089 B2 | 9/2015 | Gopalasetty |
| 9,179,321 B2 | 11/2015 | Hasarchi |
| 9,220,154 B2 | 12/2015 | Dingemans |
| 9,238,558 B2 | 1/2016 | Houck |

(Continued)

OTHER PUBLICATIONS

Shaw, Elizabeth Myers. Applying facilities planning methodology, human factors techniques, and inventory analysis to retail pharmacy design. University of Louisville ProQuest Dissertations & Theses, 1998. (Year: 1998).*

*Primary Examiner* — Florian M Zeender
*Assistant Examiner* — Fawaad Haider
(74) *Attorney, Agent, or Firm* — The Small Patent Law Group

(57) ABSTRACT

A packing system for packing products (e.g., medications) and other components into a container for shipping to customers is provided. The packing system includes a system controller that directs carrier devices along routes between task stations. The system controller can monitor the tasks performed by the task stations, the locations of the carrier devices, the tasks yet to be performed to complete packing of the containers at the task stations, and queues of other carrier devices at the stations. Based on this information, the system controller may direct the carrier devices to different stations and may change the task performed by or assigned to one or more of the stations.

11 Claims, 23 Drawing Sheets

(56) References Cited

U.S. PATENT DOCUMENTS

| | | |
|---|---|---|
| 9,271,896 B2 | 3/2016 | Clements |
| 9,280,157 B2 | 3/2016 | Wurman |
| 9,286,590 B2 | 3/2016 | Segawa |
| 9,373,065 B1 | 6/2016 | Hoffman |
| 9,409,201 B2 | 8/2016 | Summons |
| 9,575,273 B2 | 2/2017 | Cabanne Lopez |
| 9,586,008 B2 | 3/2017 | Shetty |
| 9,592,343 B2 | 3/2017 | Shetty |
| 9,597,454 B2 | 3/2017 | Wetzel |
| 9,639,245 B2 | 5/2017 | Sang |
| 9,649,303 B2 | 5/2017 | Penn |
| 9,665,688 B2 | 5/2017 | Terzini |
| 9,681,772 B2 | 6/2017 | Atilla |
| 9,694,977 B2 | 7/2017 | Aprea |
| 9,697,335 B2 | 7/2017 | Joplin |
| 9,913,147 B2 | 3/2018 | Brighenti |
| 9,944,419 B2 | 4/2018 | Joplin |
| 9,978,036 B1 | 5/2018 | Eller |
| 10,053,248 B2 | 8/2018 | Joplin |
| 10,303,854 B2 | 5/2019 | Joplin |
| 10,356,664 B2 | 7/2019 | Viger |
| 10,492,223 B2 | 11/2019 | Lee |
| 10,589,931 B2 | 3/2020 | Jarvis |
| 10,674,538 B2 | 6/2020 | Li |
| 10,702,451 B2 | 7/2020 | Lum |
| 10,782,670 B2 | 9/2020 | Crivella |
| 10,832,209 B2 | 11/2020 | Rajkhowa |
| 2007/0198347 A1 | 8/2007 | Muldoon |
| 2011/0106673 A1 | 5/2011 | Shanley |
| 2013/0173489 A1 | 7/2013 | Gabrielson |
| 2015/0073052 A1 | 3/2015 | Cook |
| 2016/0151246 A1 | 6/2016 | Sotelo |
| 2018/0074478 A1* | 3/2018 | Burkhard ......... G05B 19/41865 |
| 2018/0180429 A1 | 6/2018 | De Lorenzo |
| 2023/0126344 A1 | 4/2023 | Swindells |
| 2023/0133785 A1 | 5/2023 | Di Genova |
| 2023/0136001 A1 | 5/2023 | Di Genova |
| 2023/0139860 A1 | 5/2023 | Di Genova |

\* cited by examiner

PRODUCT PACKING SYSTEM AND METHOD

CROSS-REFERENCE TO RELATED APPLICATIONS

This application claims priority to U.S. Provisional Application No. 63/272,667 (filed 27 Oct. 2021) and U.S. Provisional Application No. 63/272,925 (filed 28 Oct. 2021), the entire disclosures of which are incorporated herein by reference.

BACKGROUND

Products can be packed into packaging for a wide variety of goods. As one example, high volume pharmacies can pack medications for mail delivery for a wide variety of medications at high speeds and volumes. Some products may require specialized handling due to the nature of the product, and/or due to laws or regulations restricting how the products are handled. With respect to medications, some narcotic-based medications are highly restricted by laws and regulations to restrict the people who have access to the medications.

While some automated, high volume product packing systems and methods exist, most of these systems and methods involve little to no personal interaction with the products or packaging until the products are packaged and ready for delivery. For example, at least some of these known systems and methods may be fully automated and rely only on cameras, motion sensors, or the like, to check on the packing of the products. But for products where strict laws or regulations exist that require certain qualified persons to inspect the products in the packages, these automated systems and methods may not be available for use. For example, the packing and delivery of certain medications may require that a pharmacist manually inspect the medications in the package prior to mailing the package.

Additionally, fully automated packing systems and methods may build up backlogs at one or more machines or robots. Some of these systems and methods are not known to be able to switch the tasks performed by these machines or robots. As a result, the backlogs may not be easily and quickly resolved as more machines or robots may not be able to be modified to perform the task(s) giving rise to the backlog.

A need may exist for a product packing system and method that both allows for high volume, high speed packing of containers with the product, but that also allows for manual inspection of the packing and the product prior to delivery by certain qualified persons. Additionally, a need may exist for a product packing system and method that provides for equipment that can be interchangeable to allow the tasks performed at or by the equipment to be quickly changed to reduce or eliminate backlogs at other equipment.

BRIEF DESCRIPTION

In one example, a method for packaging products into containers is provided. The method can include directing carrier devices to move along routes between stations where different tasks associated with packing the products into the containers carried by the carrier devices are performed, as well as determining whether a first carrier device of the carrier devices is at a first station of the stations that is assigned to a same task category as a first task that is assigned to the first carrier device and determining whether a queue of other carrier devices of the carrier devices waiting in the first station for completion of the first task is longer than a designated threshold. The method also can include, responsive to determining that the first station is assigned to the same task category as the first task and that the queue of the first station is no longer than the designated threshold, directing the first carrier device into the first station for performance of the first task, as well as assigning an additional task to the first carrier device and directing the first carrier out of the first station and to an additional station of the stations. The method also can include determining whether the additional station is assigned to the same task category as the additional task and determining whether the queue of the other carrier devices waiting in the additional station for completion of the additional task is longer than the designated threshold, and, responsive to determining that the additional station is assigned to the same task category as the additional task and that the queue of the additional station is no longer than the designated threshold, directing the first carrier device into the additional station for performance of the additional task. The method can include repeating assigning the additional task, determining whether the additional station is assigned to the same task category as the additional task, determining whether the queue of the other carrier devices waiting in the additional station for completion of the additional task is longer than the designated threshold, and directing the first carrier device into the additional station for performance of the additional task responsive to determining that the additional station is assigned to the same task category as the additional task and that the queue of the additional station is no longer than the designated threshold until a set of tasks associated with the first carrier device is completed. The category of tasks completed by at least one of the stations is configurable between different ones of the tasks.

In another example, a system for packaging products into containers is provided. The system may include a system controller that may communicate with and direct carrier devices to move along routes between stations where different tasks associated with packing the products into the containers carried by the carrier devices are performed. The system controller may determine whether a first carrier device of the carrier devices is at a first station of the stations that is assigned to a same task category as a first task that is assigned to the first carrier device. The system controller also may determine whether a queue of other carrier devices of the carrier devices waiting in the first station for completion of the first task is longer than a designated threshold. The system controller may then direct the first carrier device into the first station for performance of the first task, assign an additional task to the first carrier device, and may direct the first carrier out of the first station and to an additional station of the stations responsive to the system controller determining that the first station is assigned to the same task category as the first task and that the queue of the first station is no longer than the designated threshold. The system controller may determine whether the additional station is assigned to the same task category as the additional task and may determine whether the queue of the other carrier devices waiting in the additional station for completion of the additional task is longer than the designated threshold. The system controller may then direct the first carrier device into the additional station for performance of the additional task responsive to the device controller determining that the additional station is assigned to the same task category as the additional task and that the queue of the additional station is no longer than the designated threshold. The system controller and device controller may repeat assigning the additional task, determining whether the additional station is assigned to the same task category as the additional task, determining whether the queue of the other carrier devices waiting in the additional station for completion of the additional task is longer than the designated threshold, and directing the first carrier device into the additional station for performance of the additional task responsive to determining that the additional station is assigned to the same task category as the additional task and that the queue of the additional station is no longer than the designated threshold until a set of tasks associated with the first carrier device is completed. The system controller may change the category of tasks completed by at least one of the stations between different ones of the tasks.

BRIEF DESCRIPTION OF THE DRAWINGS

In the drawings, reference numbers may be reused to identify similar and/or identical elements.

DETAILED DESCRIPTION

Figure 1:
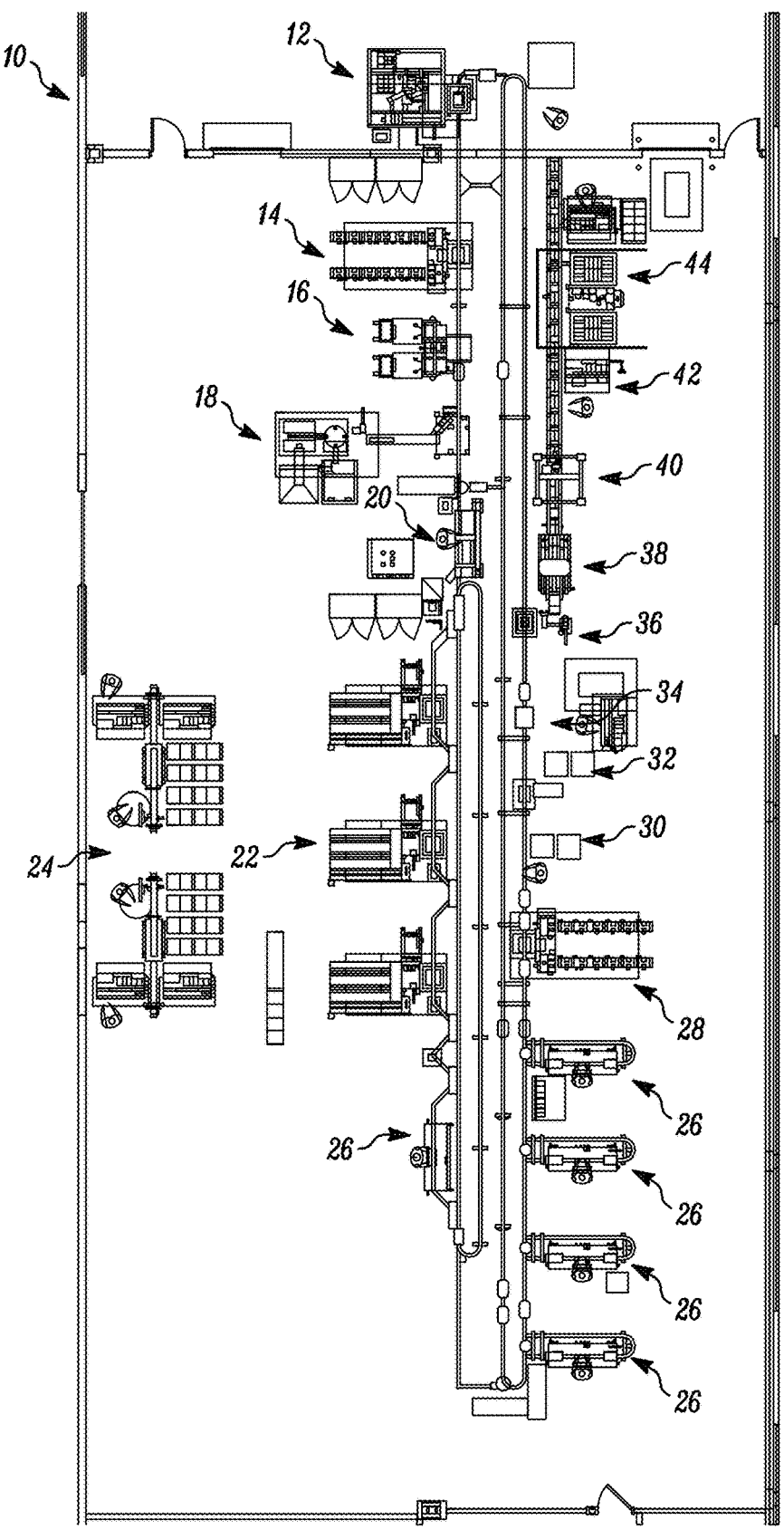
FIG. 1 is a plan view of a pharmaceutical order processing system according to one embodiment of the present disclosure.

The subject matter described herein provides a product packing system and method that can quickly package various products for delivery, while allowing for a manual inspection of the products prior to sending for delivery. One or more examples of the inventive subject matter is described in connection with the packing and inspection of medications, such as narcotics or other restricted drugs or medications, not all embodiments of the inventive subject matter are limited or restricted to the packing and inspection of medications. One or more embodiments may relate to the packing of other products that may or may not require manual inspection. One or more embodiments may package ancillary devices with the medication or other product being packaged.

The packing system can include several shuttle devices that carry containers, products, etc. between different stations within the packing system. Each station may be active or inactive, and each station may be in a different work category based on the task that is performed at that station. One or more, or each, of the stations may switch work categories so that different tasks may be performed at the same station, but during different time periods. For example, some stations may be automated stations where the task(s) performed at those stations is or are automatically performed by machines (e.g., robots, such as pick-and-place robots), while other stations may be manual stations where the task(s) performed at those stations is or are manually performed by people. The different work categories can vary depending on the product being packaged, but in one example, can include picking and placing packaging and/or the product into a container (referred to as a pick task), quality review of the product and packaging that has been placed into a container (e.g., by the pick task), fixing or correcting the packaging or product that was incorrectly placed into the container (e.g., which may have been flagged as erroneous during the quality review), or the like. The packaging can include placing cardboard or filler material to protect the product during shipping, placing cooling packs or the like in the container, etc. One or more stations may be inactive, or bypass, stations, meaning that no task is performed at that station. One or more stations may be capable of performing multiple tasks with one task being assigned to the station at a time. The present methods and systems will track packages and assign a shuttle carrying the package to be delivered to the station in need of performance of a task that is performed at the station.

The packing system can include routes that extend between the stations. These routes can be provided by rails on which the carrier devices move, conveyors that move the carrier devices, or the like. The packing system can have a system controller that controls or directs which tasks are performed by the different stations at different times, which stations are to be bypassed by the carrier devices, where and/or how carrier devices move within the packing system (including which stations, switches, or other locations that the different carrier devices are to move), the positions or states of switches along routes in the packing system, etc. The system controller also can direct the carrier devices to move to different stations as tasks are completed. The carrier devices may include local controllers (e.g., device controllers) that control communication between the carrier devices and the system controller, control communication between the carrier devices and the stations, and that control movement of the carrier devices based on communications with the system controller. In one embodiment, the system controller provides movement instructions or indicators to each carrier device. This instruction can be data that is optically communicated (via infrared communications, via a camera, or via another wireless manner and/or via a wired connection) to the carrier device. In another example, the instruction is wirelessly send to the carrier device. In another example, the carrier device includes contacts that are electrically connected to wiring to receive instructions, this can occur at the beginning or ending of a segment of the route. The instruction can identify the next location that the carrier device is to move to, such as a next or downstream communication device along the routes in the packing system, a station, or the like.

For example, the movement instruction communicated from the system controller to the device controllers may notify a carrier device that the carrier device is to next move to a pick station (where the station will automatically or manually pick up and place packaging and/or product in a container), a correction or re-work station (where the station will automatically or manually remove extra or extraneous material erroneously placed into the container, an inspection station (where the contents of the container is manually or automatically inspected), or the like. The carrier devices may then move along the route(s) of the packing system to another location (e.g., switch, communication device, or station) according to the instruction so that the tasks needed to complete packing of the containers carried by the carrier devices is completed. The system controller can monitor locations of the carrier devices throughout the packing system, including in the stations or waiting for other carrier devices already in stations, to determine which locations to direct the carrier devices toward. In one embodiment, the system controller determines which task(s) need to be next completed for each carrier device, which stations perform the task(s), and determines the queue of other carrier devices already waiting for task completions at those stations. Based on this information, the system controller determines which location (e.g., station or switch outside of a station) to direct each carrier device toward to avoid bottlenecks or backups at stations, switches, or other locations. A bottleneck or backup may exist at a station where the rate, speed, or frequency at which carrier devices move through the station decreases below a lower throughput threshold. The carrier device may receive an instruction from the system controller after reaching each switch, station, or other location that directs the carrier device to move to the next switch, stations, or other location, until all tasks needed to pack and inspect the packing of the container is complete (and approved). The carrier device may then provide the container to a location that removes the container for delivery to a customer or patient.

This packing system and method can allow for the task category assigned to various stations to be quickly and easily changed, which permits the packing system to be easily scalable and modifiable to address backlogs at stations. For example, some stations may manually perform the pick task, inspection task, and/or correction or re-work task. In an example embodiment, a single task is assigned to one station at a time. The system controller can change how many of these manual stations are performing different tasks to ensure that the throughput of the packing system (e.g., the rate at which products are correctly packaged and output from the packing system) remains high, while allowing for some manual inspection of some products.

Figure 2:
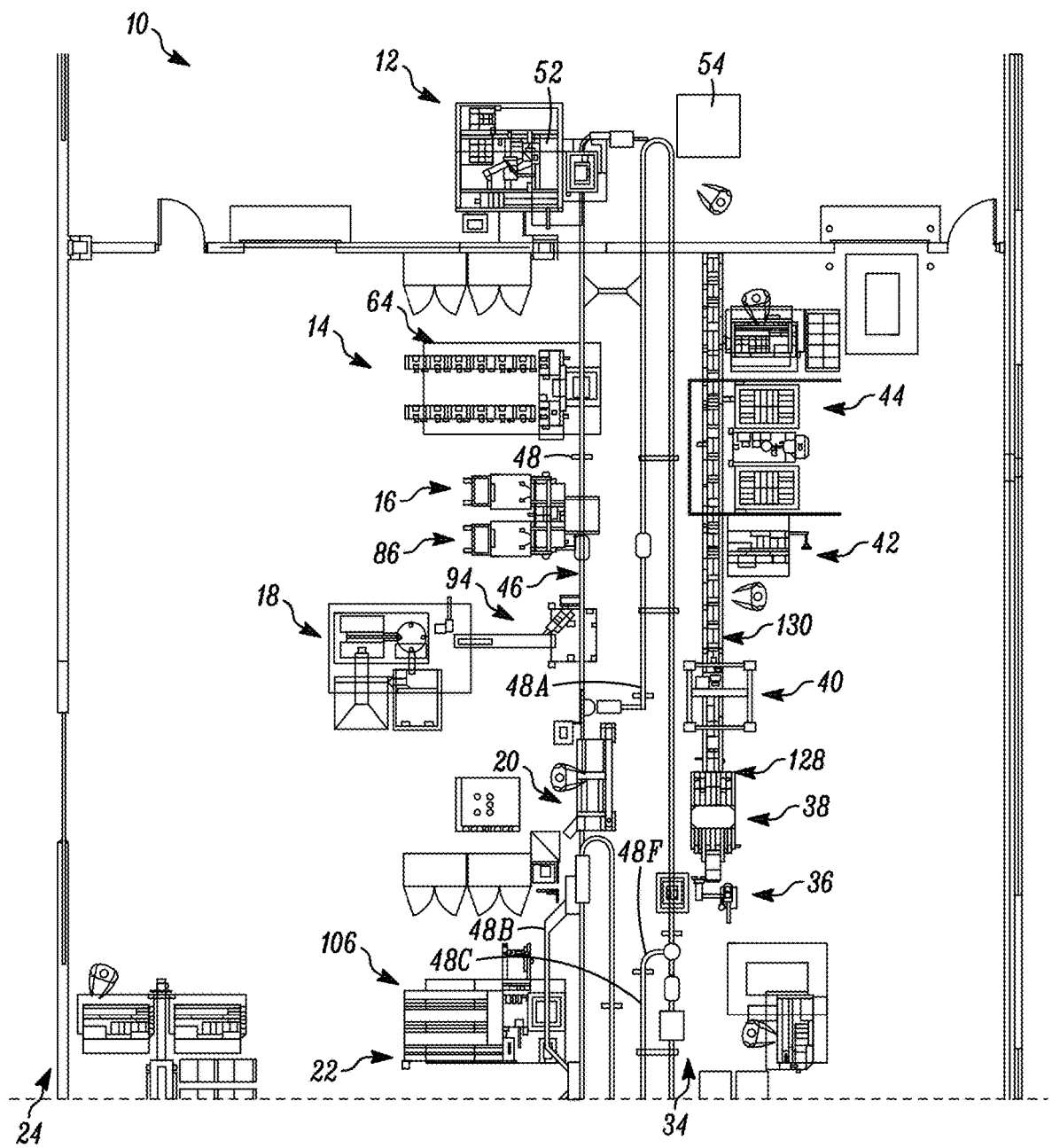
FIG. 2 is an enlarged, fragmentary plan view of a portion of the pharmaceutical order processing system.
Figure 3:
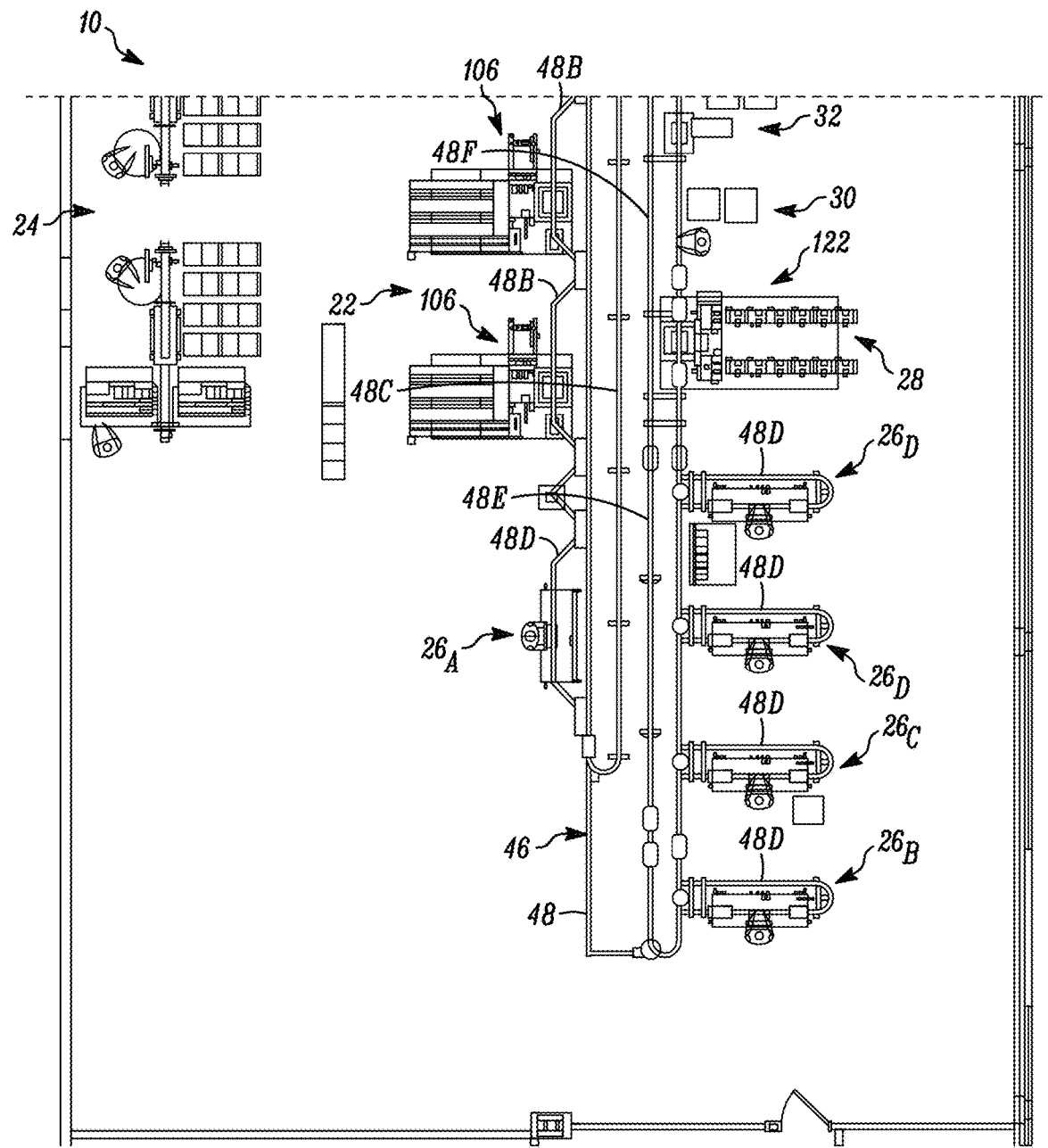
FIG. 3 is an enlarged, fragmentary plan view of another portion of the pharmaceutical order processing system.
Figure 4:
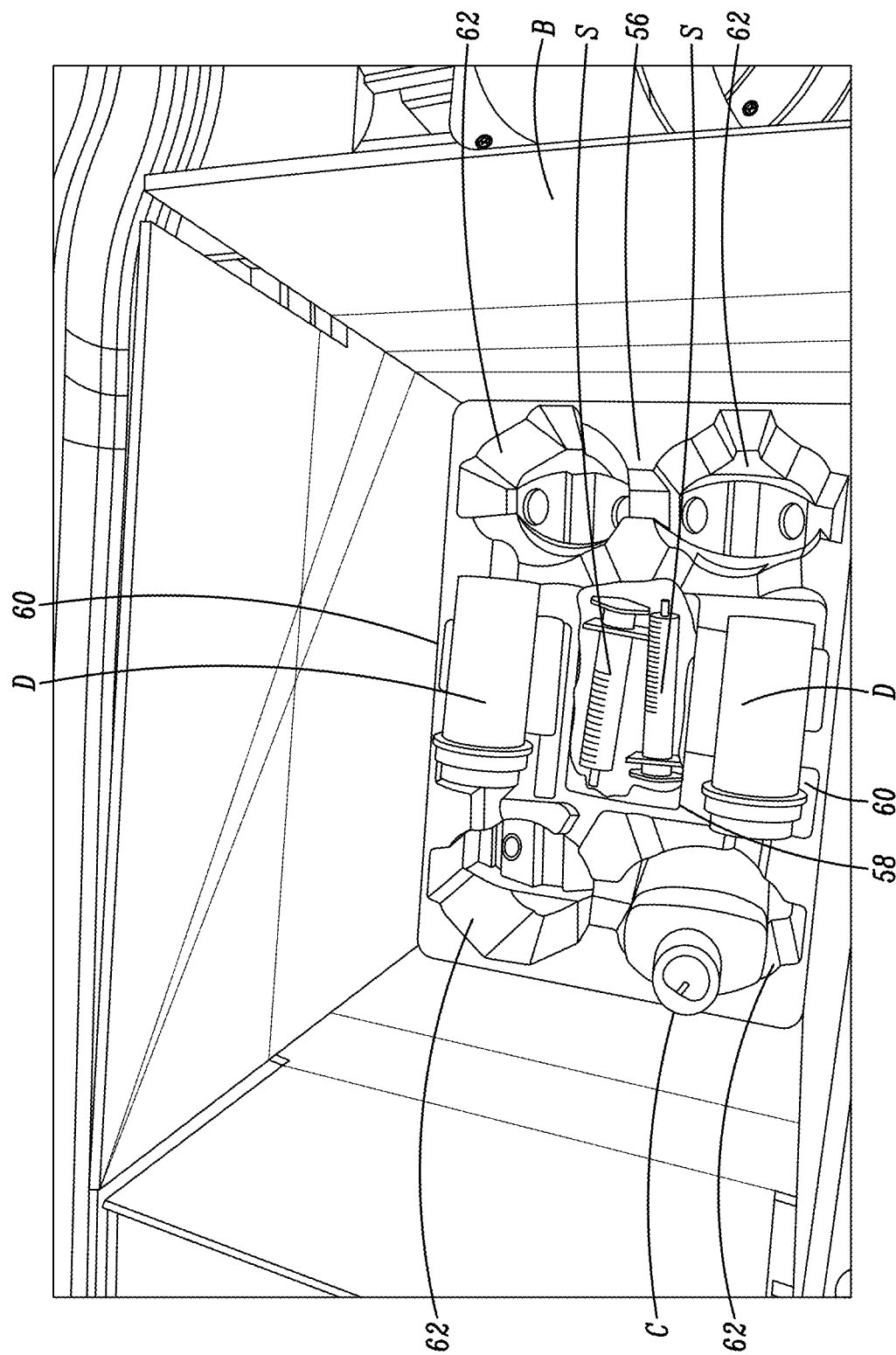
FIG. 4 is an image of a box filled by the pharmaceutical order processing system.
Figure 5:
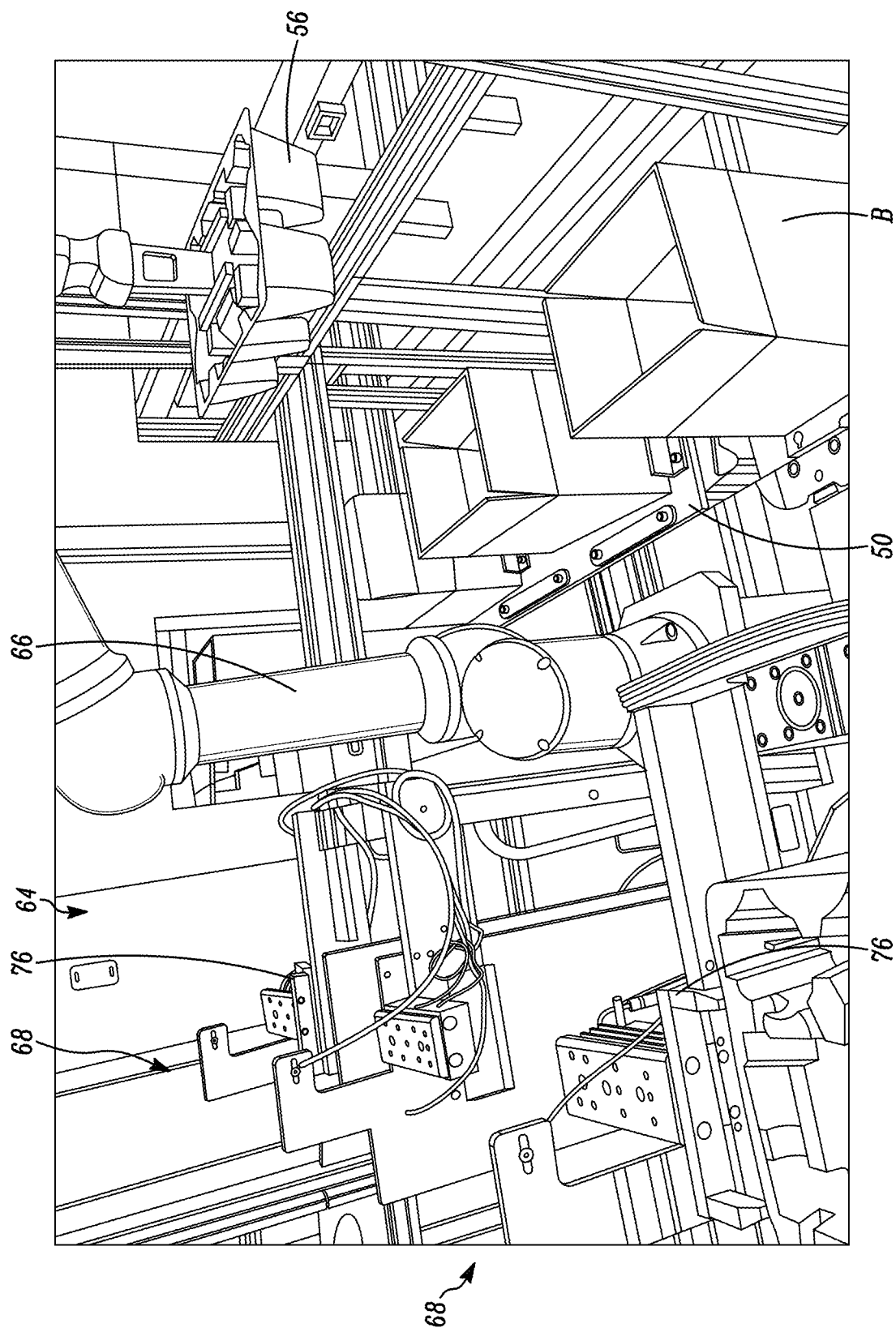
FIG. 5 is an image of a lower insert placer of the pharmaceutical order processing system.

Referring to FIGS. 1 through 3, a pharmaceutical order processing system ("system") according to one embodiment of the present disclosure is generally indicated at 10. The system 10 optionally can be referred to as a product packing system. The system 10 processes prescription orders received by the system. A prescription order may include one or more pharmaceuticals (e.g., prescription drugs), which are contained in pharmaceutical containers C (FIG. 4). The illustrated pharmaceutical containers C are in the form of bottles, although it is understood the pharmaceutical containers may have other forms such as a box or any other suitable container. The pharmaceutical order processing system 10 comprises a unit-of-use system that processes pharmaceutical containers C that are generally unit-of-use products. The pharmaceutical order processing system 10 generally stores, monitors, labels, dispenses and packages the unit-of-use pharmaceutical containers C. The system 10 also packages syringes S and dosing cups D with the pharmaceutical containers C in a box or package B (FIG. 4). In the illustrated embodiment, the system 10 processes liquid pharmaceuticals. When a patient takes the liquid pharmaceutical, the patient measures an amount of the liquid pharmaceutical using the syringe S and generally dilutes the amount with another liquid, such as water, in the dosing cup D. It is understood the pharmaceutical order processing system 10 may also be used with non-unit-of-use systems, such as a high-volume pharmaceutical order processing system (e.g., a high-volume filler). Further details on pharmaceutical order processing systems and components thereof, including unit-of-use systems, may be found in U.S. Pat. Nos. 9,373,065, 9,697,335, 9,944,419, 9,978,036, and 10,053,248, the entireties of which are hereby incorporated by reference. However, it will be appreciated that the systems and components disclosed herein can be used in other contexts without departing from the scope of the present disclosure.

The system 10 processes the syringes S, the dosing cups D, and the pharmaceutical containers C to fill prescription orders. To process the prescription order, the system 10 includes a set of operation stations (described in more detail below) along which a set of processing operations occur. Broadly, a station is where one or more operations (e.g., functions) occur to further the processing or fulfilment of the prescription order and generally include the one or more components that perform the one or more operations (i.e., the one or more components are at the station). One or more operations may occur at each station. In the illustrated embodiment, the system 10 includes a box erector station 12, a lower insert station 14, a syringe station 16, a dosing cup station 18, a box check station 20, a pharmaceutical container station 22, a filling station 24, a manual station 26, an upper insert station 28, a manual paper insert station 30, an automatic paper insert station 32, an weighing station 34, an unloading station 36, a box closing station 38, a shipping labels station 40, a shipping label verification station 42, and collection station 44. The system 10 may include one or more of each type of station. Also, stations can be omitted entirely. The system 10 may also include other types of stations as well. As will become apparent, the system 10 processes and fulfills a prescription order using the stations. The system 10 is generally an automated system used to auto process received prescription orders. The general movement between the stations is described in more detail below, although other paths of movements between the stations are within the scope of the present disclosure.

The system 10 includes a conveyor 46. The conveyor 46 includes a pathway or track 48 (e.g., mono-rail) and one or more carriers or carriages 50 (e.g., box carriers or carriages) movable along the pathway. The pathway 48 generally travels between the stations (e.g., the stations are positioned along the pathway). Each carriage 50 is configured to support and move a box B along the pathway 48 to the different stations. In an example embodiment, each carriage is a standalone device with a motor to move independently along the pathway 48. In an example embodiment, two to five carriages may be connected together to travel along the pathway 48. In this example, the connected carriages are separate from other carriages. In an example embodiment, at least one carrier 50 is separate from another carrier in front or behind the at least one carrier 50. The pathway 48 forms a closed loop, allowing the carriages 50 to repeatedly move to different stations along the pathway. As will come apparent, the carriages 50 travel in as single direction (e.g., a generally counter-clockwise direction) along the pathway 48. The pathway 48 includes a main path and one or more branch paths (described in more detail below). The main path of the pathway 48 forms the closed loop. In one embodiment, each carriage 50 includes a mover, such one or more wheels connected to an electric motor, which moves the carriage 50 around the pathway 48. Thus, each carriage 50 is independently moveable along the pathway 48. Each carriage 50 may include an identification tag (not shown), such as an RFID tag or a machine-readable tag. The identification tag can contain an identifier (such as a carriage number or an order number) to associate the identifier with the particular carriage 50. Some of the stations may include communication modules or scanners, such as RFID scanners, which are used to acquire the identifier from the identification tag.

Still referring to FIGS. 1 and 2, the box erector station 12 of the system 10 erects the boxes B. The box erector station 12 may include an automated box erector 52 that automatically erects the boxes B (e.g., cardboard boxes) from generally flat box blanks. The box erector station 12 may also include a table 54 for the manual construction of the boxes B. Preferably, the box erector station 12 is in a different room than the rest of the stations, as shown, to prevent cardboard dust from the boxes B from reaching the other stations. In the illustrated embodiment, the box erector station 12 is in one room and the other stations are in a separate room. Each room can have a separate environment control system to control the environment and filter the air therein. At the box erector station, empty carriages 50 receive the erected boxes B. The erected boxes B are still open at the top to allow the different elements (e.g., order components) to be inserted or placed into the boxes. In one embodiment, the identifier of the identification tag of the carriage 50 is set at the box erector station. Preferably, the system 10 also includes a box ID applier (not shown) configured to apply a machine-readable marking on the box B. The box ID applier may be at the box erector station 12. The machine-readable marking (e.g., a barcode, 2D code, QR code, alphanumeric code, etc.) generally represents an identifier associated with a prescription order (such as the order number) received by the system 10. The identifier may also be used to identify the box B. The identifier represented by the machine-readable marking may be the same or different from the identifier in the identification tag on the carriage 50. Some of the stations may include scanners, such as barcode scanners, that are used to acquire the identifier from the machine-readable marking. Some of the stations may initiate processes or tasks based on the acquisition of the identifier from the box B and/or carriage 50. After the box B is loaded onto its corresponding carriage 50, the carriage travels (downstream) along the pathway 48 to move the box to the lower insert station 14.

At the lower insert station 14, a lower insert 56 (e.g., lower box insert) is inserted into to box B. The lower insert 56 includes one or more syringe compartments 58 for receiving the syringes S, one or more dosing cup compartments 60 for receiving the dosing cups D and one or more pharmaceutical container compartments 62 for receiving the pharmaceutical containers C (FIG. 4).

Referring to FIGS. 5-9, the lower insert station 14 includes a lower insert placer 64 (e.g., an insert loader). The lower insert placer 64 is configured to place a lower insert 56 into the box B (when the carriage 50 carrying the box is at the lower insert station 14). The lower insert placer 64 includes an insert transporter 66 configured to move the lower insert 56 into the box B. Specifically, the insert transporter 66 is configured to pick up and remove an insert 56 from a stack and place the insert in the box B. In the illustrated embodiment, the insert transporter 66 comprises a robot such as a six-axis robotic arm, although other robots are within the scope of the present disclosure. For example, the insert transporter 66 may comprise a selective-compliance-articulated robotic arm, a cylindrical robot, a delta robot, a polar coordinate robot, a vertically articulated robot, a Cartesian coordinate robot or any other suitable device. The insert transporter 66 includes a lower insert grabber (broadly, end-of-arm tooling) configured to selectively grab a lower insert 56 to move the lower insert.

The lower insert placer 64 includes at least one insert supplier 68. In the illustrated embodiment, the lower insert placer 64 includes two insert suppliers 68, one on each side of the insert transporter 66. This provides redundancy, enabling the lower insert placer 64 to still be able to place the lower inserts 56 into boxes B even if one of the insert suppliers 68 stops working. The two insert suppliers 68 are generally identical, accordingly, one insert supplier will now be described with the understanding the description applies to both insert suppliers.

The insert supplier 68 is configured to supply the lower inserts 56 to the insert transporter 66. The insert transporter 66 removes the lower inserts 56, one at a time, from the insert supplier 68 to place each lower inserts into one of the boxes B. The insert supplier includes an insert receiver 70 and a lift 72. The insert receiver 70 has (e.g., defines) an interior sized and shaped to receive and hold a stack 74 of lower inserts 56. The insert receiver 70 has a rear wall and opposite side walls that define the interior. The front the interior is open to permit a stack 74 of lower inserts to enter the interior. The interior of the insert receiver 70 has a generally rectangular cross-sectional shape to match the shape of the lower inserts 56. The insert receiver 70 includes (e.g., defines) a removal location adjacent (e.g., at) an upper end of the insert receiver. The removal location is the location from which the lower inserts 56 are removed from the insert receiver 70 by the insert transporter 66. Specifically, the insert transporter 66 grabs the lower insert 56 at the removal location and removes (e.g., picks up) the lower insert from the stack 74 and insert receiver 70. The lift 72 moves the stack 74 of lower inserts 56 upward so that the upper-most lower insert 56 (e.g., the insert at the top of the stack) is disposed at the removal location. In particular, the lift 72 supports the stack 74 of lower inserts 56 and moves upward to move the lower inserts toward the removal location. The lift 72 moves the stack 74 of lower inserts 56 upward after the upper-most lower insert is removed by the insert transporter 66 to move the subsequent upper-most lower insert (now the upper-most lower insert) to the removal location, thereby positioning the subsequent upper-most lower insert at the removal location to be grabbed by the insert transporter. This process repeats (e.g., the lift 72 continues to rise) as the lower inserts 56 are moved from the stack 74 until there are no more inserts in the insert receiver 70.

The lift 72 includes a riser that supports the stack 74 from the bottom. The lift 72 includes a prime mover, such as an electric motor or any other suitable device, that moves the riser up and down relative to the insert receiver 70. In the illustrated embodiment, the riser is a conveyor (e.g., a lift conveyor). The lift conveyor is configured to move a stack 74 of lower inserts 56 to position the stack on the lift 72 (from the insert conveyor 82 described below). In the illustrated embodiment, the lift conveyor includes a conveyor belt, which moves the stack.

The insert supplier 68 includes one or more keepers 76. The keepers 76 ensure that only one lower insert 56 is removed at a time by the insert transporter 66. In the illustrated embodiment, the insert supplier 68 includes a keeper 76 on each side of the insert receiver 70. Each keeper 76 is configured to engage the subsequent upper-most lower insert 56 in the stack 74 to retain or keep said lower insert in the insert receiver 70 when the top or upper-most lower insert is removed by the insert transporter 66. As illustrated, the lower inserts 56 in the stack 74 are nested together, such that they may stick together. In this case, the keepers 76 engage the subsequent upper-most lower insert 56 in the stack 74 as the upper-most lower insert is removed from the insert receiver 70 by the insert transporter 66 to prevent the subsequent upper-most lower insert that is stuck to the upper-most lower insert from being removed with the upper-most lower insert. Each keeper 76 is moveable between a keeping position and a non-keeping position. In the keeping position, the keeper 76 is positioned to engage (or be engaged by) the subsequent upper-most lower insert 56 in the stack 74. This way the keeper 76 retains the subsequent upper-most lower insert 56 in the stack 74. In the non-keeping position, the keeper 76 is positioned to not engage (or to not be engaged) by the stack 74 of lower inserts 56 when the lift 72 raises the stack of lower inserts to move the upper-most insert (formerly the subsequent upper-most insert) to the removal location. Each keeper 76 is operatively connected to a prime mover, such as a linear piston or electric motor, that moves the keeper between the keeping and non-keeping positions.

The insert supplier 68 includes an insert sensor 78. The insert sensor 78 is configured to detect the presence of a lower insert 56 in the removal location of the insert receiver 70. The insert sensor 78 may be any suitable sensor for detecting the presence of the lower insert 56 such as but not limited to a proximity sensor (e.g., a photoelectric sensor, infrared sensor). The insert sensor 78 is generally aligned (e.g., coplanar) with the removal location.

The insert supplier 68 also includes an orientation sensor 80. The orientation sensor 80 is configured to detect the orientation of the lower insert 56 at the removal location. If the lower insert 56 is in the incorrect orientation as detected by the orientation sensor 80, then the insert transporter 66 will rotate (about 180 degrees) the lower insert to the proper orientation before placing the lower insert in the box (e.g., when moving the lower insert into to the box).

The insert supplier 68 includes an insert conveyor 82. The insert conveyor 82 is configured to move additional or subsequent stacks 74 of lower inserts 56 toward the lift 72. The insert conveyor 82 allows additional stacks 74 of lower inserts 56 to be staged so that once the stack on the lift 72 is gone, the lift 72 can return to a loading position where the lift is arranged to receive the next stack from the insert conveyor. In the illustrated embodiment, the insert conveyor 82 comprises a plurality of individual conveyors arranged end to end. Each individual conveyor is independently moveable of the other individual conveyors. For example, each individual conveyor has its own prime mover, such as an electric motor, that is operatively coupled to a conveyor belt. Each individual conveyor also includes an insert sensor, such as the insert sensor described above, for detecting whether a stack 74 of lower inserts 56 is present on that individual conveyor. Being able to individually move sections of the insert conveyor 82 allows stacks 74 to be placed on the insert conveyor 82 at generally any time, instead of all at once (when empty) as would be the case if the insert conveyor included only one moveable section instead of multiple moveable sections.

The insert supplier 68 may also include two guide walls 84 at the entry to the insert conveyor 82. The guide walls 84 are on opposite sides of the insert conveyor 82. The guide walls 84 are arranged to engage the sides of a stack 74 of lower inserts 56 if the stack is leaning too far to one side or the other to straight or true up the stack. By straightening the stack 74, the likelihood of the stack falling over while on the insert conveyor 82 is reduced and the stack is properly arranged to be moved into the insert receiver 70.

The lower insert placer 64 may include a box sensor (not shown), such as a photo eye, configured to detect the presence of a box B on the carriage 50. This can be used to confirm there is in fact a box B on the carriage 50 before placing lower insert 56 (e.g., prevents the lower insert from being placed on a carriage with no box).

The lower insert placer 64 may include an insert placer controller (not shown) for controlling the operations of the lower insert placer. The insert placer controller may be a dedicated controller for the lower insert placer 64 or a controller of the system 10. The insert placer controller controls the insert transporter 66 and the insert suppliers 68. The insert placer controller includes a CPU or process (e.g., an insert placer processor) and RAM or memory (broadly, non-transitory computer readable storage medium). Broadly, the memory includes (e.g., stores) processor-executable instructions for controlling the operation of the lower insert placer 64 and the components thereof. The instructions embody one or more of the functional aspects of the lower insert placer 64 and the components thereof (as described herein), with the processor executing the instructions to perform said one or more functional aspects. The components of the lower insert placer 64 may be in wired or wireless communication with the insert placer controller. Other control configurations are within the scope of the present disclosure.

The insert placer controller is communicatively coupled to the lift 72 (e.g., prime mover thereof). The insert placer controller is configured to operate each lift 72 to move the lower inserts 56 upward toward the removal location after the upper-most lower insert of the stack 74 has been removed from the removal location to move the subsequent upper-most lower insert to the removal location. The insert placer controller is communicatively coupled to each insert sensor 78. The insert placer controller operates the lift 72 based on information or signals received from the corresponding insert sensor 78. The insert placer controller is configured to operate the lift 72 (e.g., prime mover) to move the corresponding lower inserts 56 upward when the insert sensor 78 does not detect the presence of the lower insert in the removal location until the insert sensor detects the presence of a lower insert (e.g., subsequent upper-most lower insert). When a lower insert 56 (e.g., upper-most lower insert) is in the removal location, the insert sensor 78 detects the presence of the lower insert and informs (e.g., sends a signal to) the insert placer controller accordingly. Once the upper-most lower insert 56 is removed from the removal location, by the insert transporter 66, the insert sensor 78 no longer detects a lower insert in the removal location and informs the insert placer controller. The insert placer controller then operates the lift 72 to raise the riser and the stack 74 of lower inserts 56 until the subsequent upper-most lower insert is positioned at the removal location. Once the subsequent upper-most lower insert 56 enters the removal location, its presence is detected by the insert sensor 78, which informs the insert placer controller. Upon receiving the signal from the insert sensor 78 that a lower insert 56 is now in the removal location, the insert placer controller stops the movement of the lift 72. Accordingly, the insert placer controller generally conducts a closed loop process or routine to repeatedly move the stack 74 of lower inserts 56 upward to replace the lower insert removed from the removal location.

A similar closed-loop process can be used to move the stacks 74 of lower inserts 56 on the insert conveyor 82 toward the insert receiver 70. Using the insert sensors on each individual conveyor of the insert conveyor 82, the insert placer controller can operate the individual conveyors such that the stacks 74 are staged one after another adjacent the insert conveyor. For example, if the insert sensor of the individual conveyor adjacent the insert receiver 70 does not detect a stack 74 but another insert sensor of another individual conveyor does, the insert placer controller can operate the necessary individual conveyors to move the stack to the individual conveyor adjacent the insert receiver.

The insert placer controller can also operate the insert transporter 66 to rotate the lower insert 56 if needed. For example, the insert placer controller can receive a signal from the orientation sensor 80 that the lower insert 56 is in the incorrect orientation. Based on this signal, the insert placer controller can operate the insert transporter 66 such that the insert transporter rotates the lower insert after the insert transporter picks up the lower insert.

After the lower insert 56 is placed in the box B, the carriage 50 supporting the box travels (downstream) along the pathway 48 to move the box to the syringe station 16.

Figure 10:
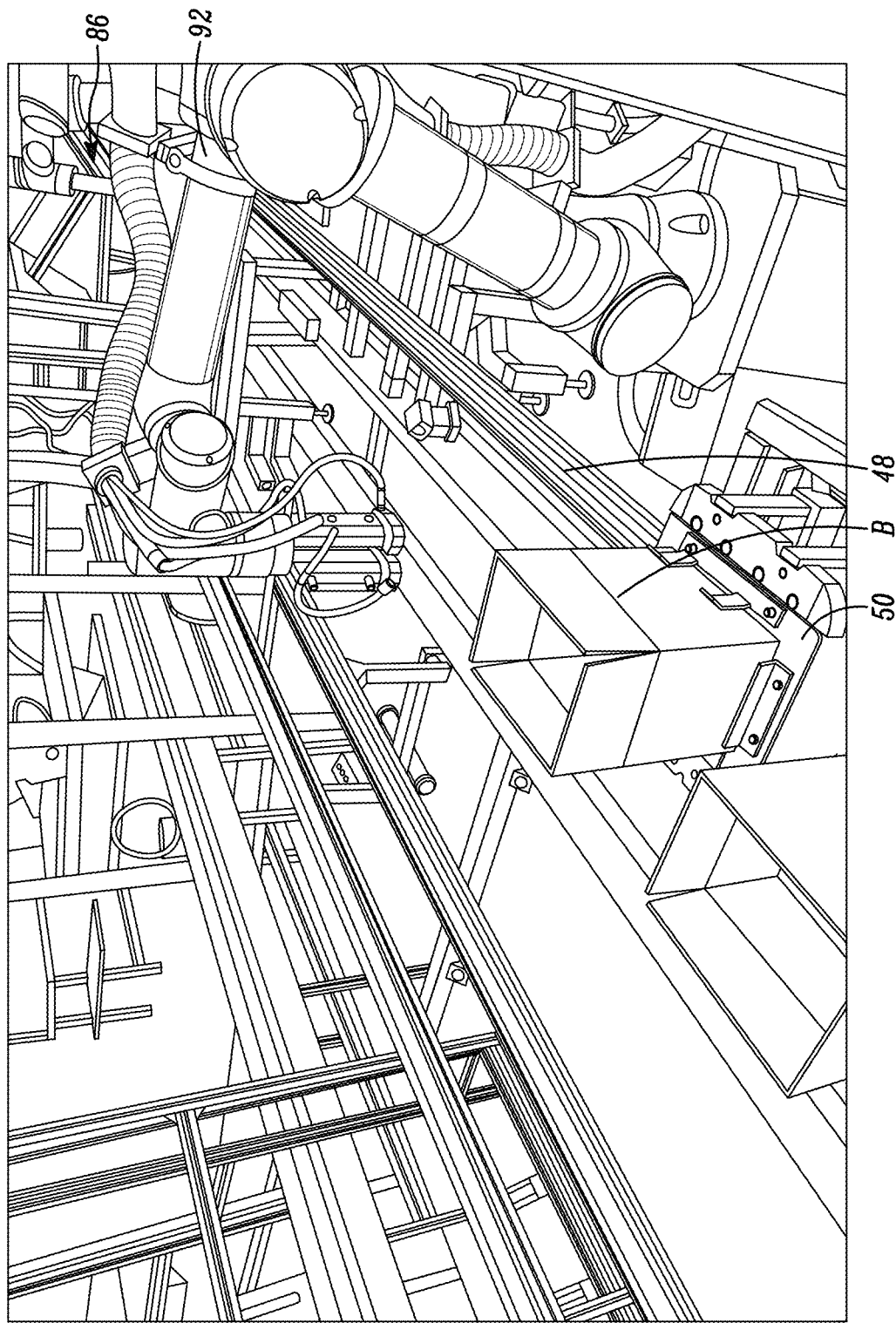
FIG. 10 is an image of a syringe placer of the pharmaceutical order processing system.
Figure 11:
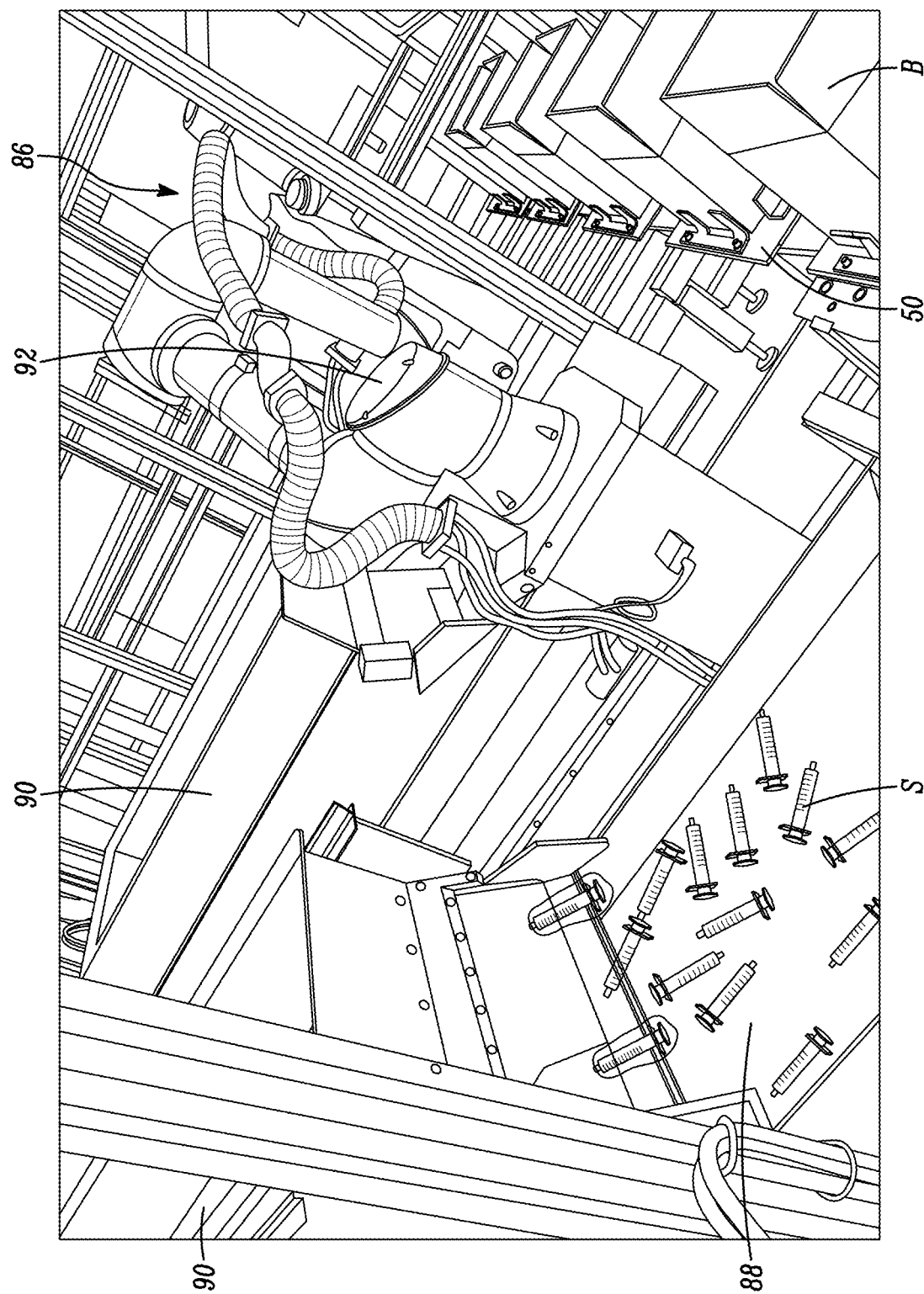
FIG. 11 is an image of the syringe placer.
Figure 12:
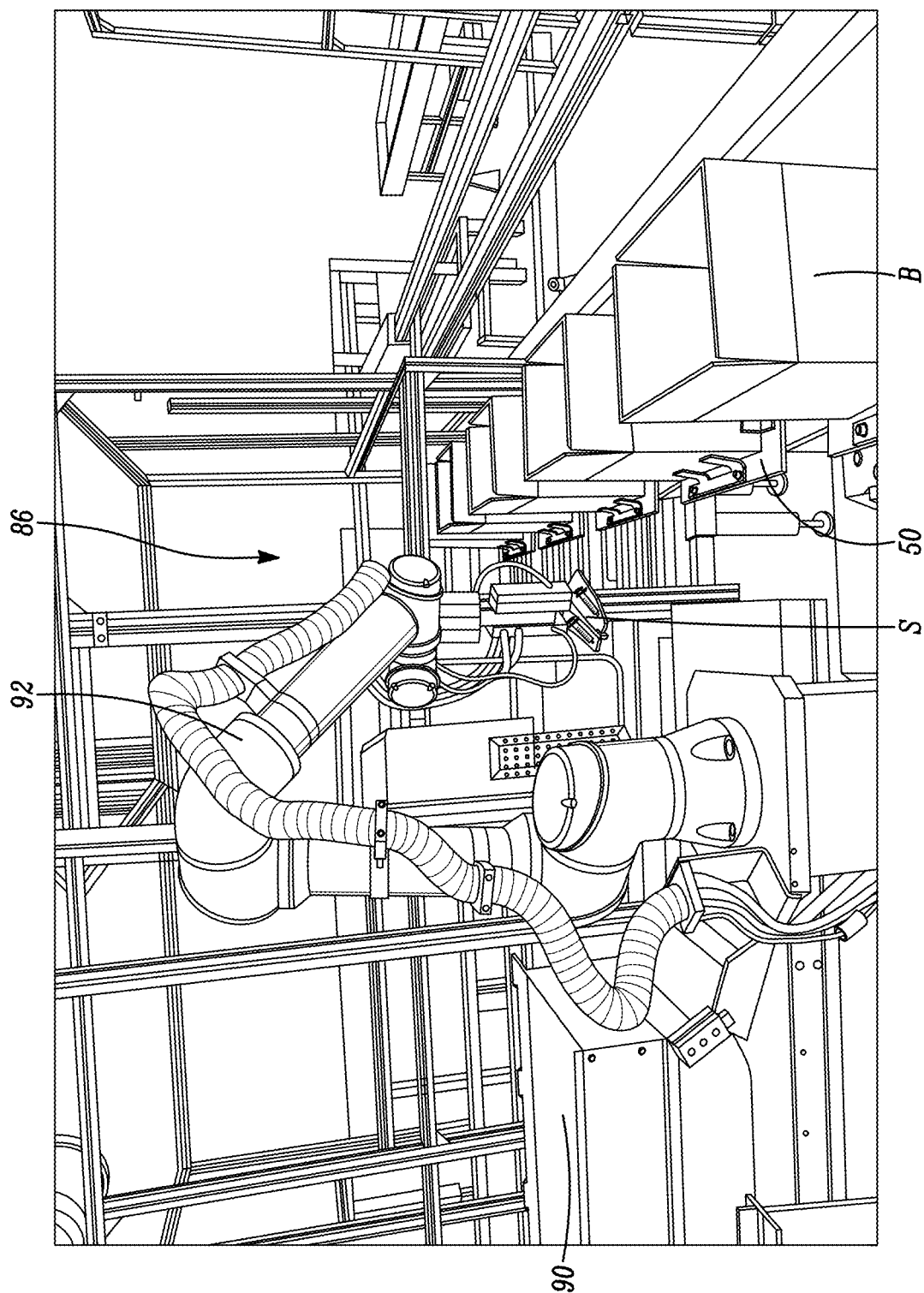
FIG. 12 is an image of the syringe placer.

Referring to FIGS. 10-12, the syringe station 16 includes a syringe placer 86. The syringe placer 86 is configured to place a syringe S into the syringe compartment 58 of the lower insert 56 (broadly, place the syringe in the box B). The syringe placer 86 includes a shaker table 88 with a hopper 90 and a syringe transporter 92. The hopper 90 holds a supply of syringes S, which are moved onto the shaker table 88 via the shaking. In the illustrated embodiment, the syringe placer 86 includes two shaker tables 88 with hoppers 90, one on each side of the syringe transporter 92. This provides redundancy, enabling the syringe placer 86 to still be able to place the syringes S into boxes B even if one of the shaker tables 88 stops working. The two shaker tables 88 with hoppers 90 are generally identical. The syringe transporter 92 is configured to pick up and remove the syringes S from the table 88 and place the syringes in the box B. In the illustrated embodiment, the syringe transporter 92 comprises a robot such as a six-axis robotic arm, although other robots are within the scope of the present disclosure. For example, the syringe transporter 92 may comprise a selective-compliance-articulated robotic arm, a cylindrical robot, a delta robot, a polar coordinate robot, a vertically articulated robot, a Cartesian coordinate robot or any other suitable device. The syringe transporter 92 includes a syringe grabber (broadly, end-of-arm tooling) configured to selectively grab one or more syringes S to move the syringes. The syringe grabber may be configured to pick up one, or preferably more than one (e.g., two), syringes S at a time. A camera system (not shown) detects the position of the syringes S on the shaker table 88 and the syringe transporter 92 grabs the syringes S off the shaker table based on the detected position. Other configurations are within the scope of the present disclosure. After the one or more syringes S are placed in the box B, the carriage 50 supporting the box travels (downstream) along the pathway 48 to move the box to the dosing cup station 18.

Figure 13:
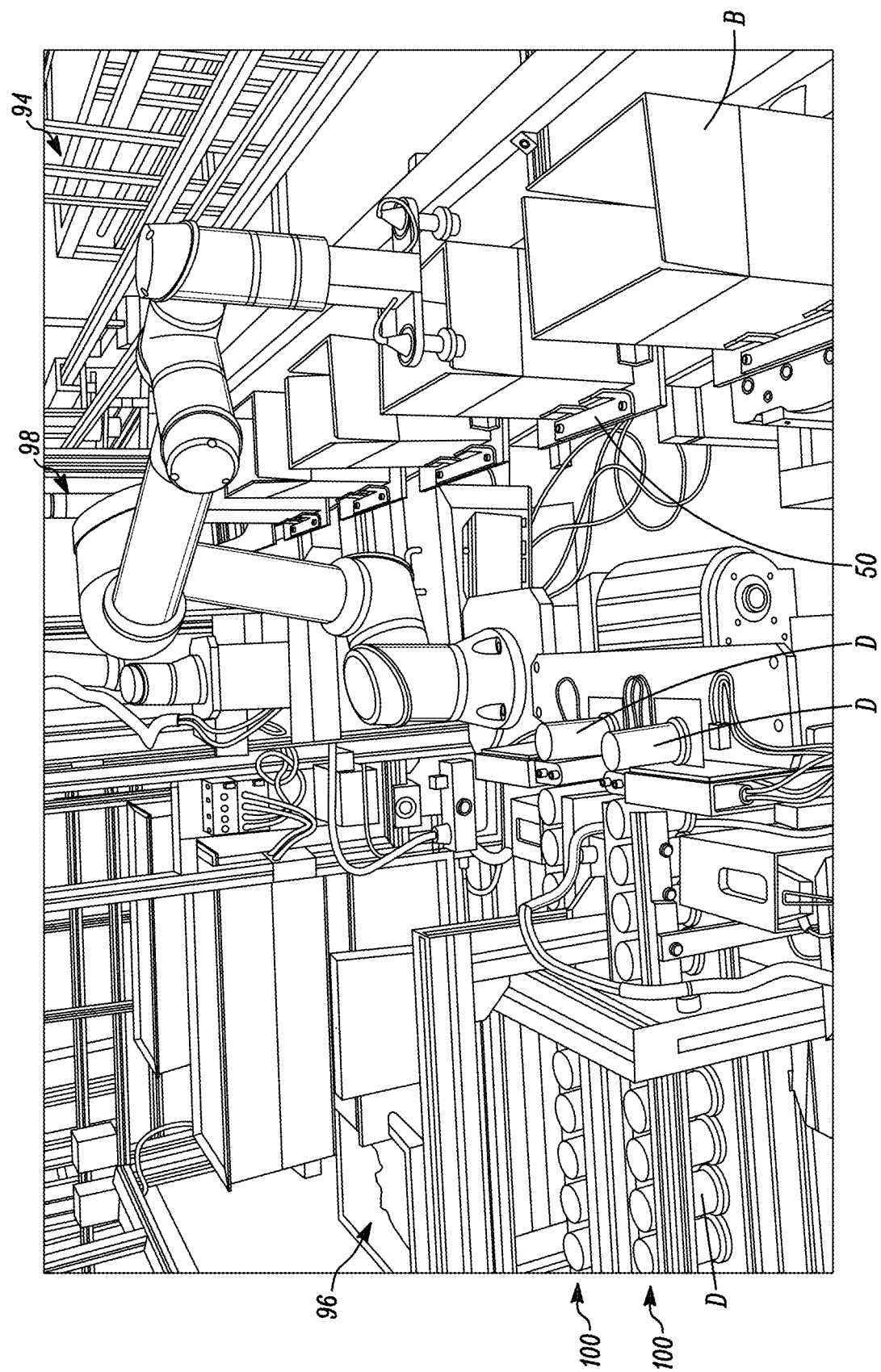
FIG. 13 is an image of a dosing cup placer of the pharmaceutical order processing system.
Figure 14:
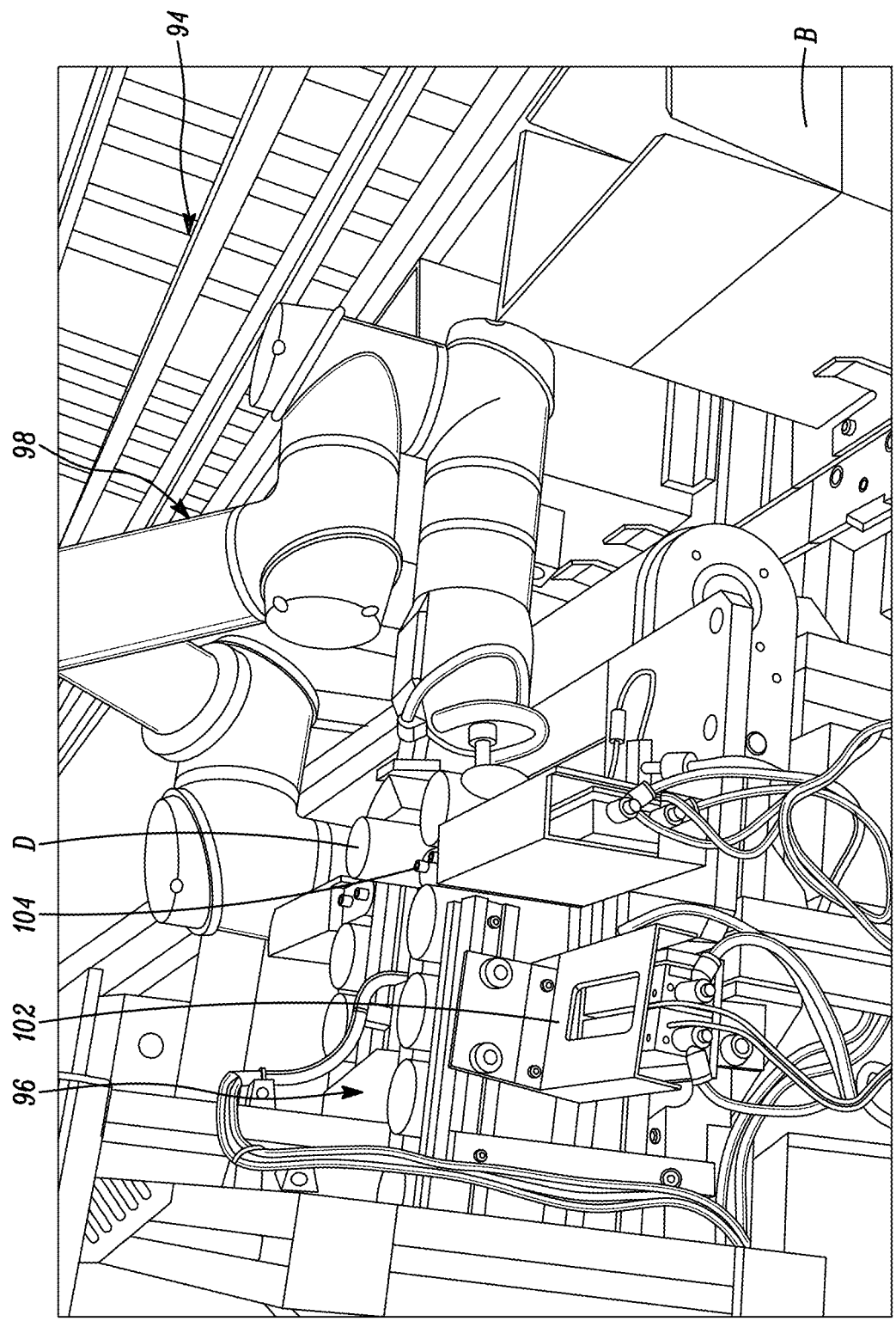
FIG. 14 is an image of the dosing cup placer.

Referring to FIGS. 13 and 14, the dosing cup station 18 includes a dosing cup placer 94. The dosing cup placer 94 is configured to place a dosing cup D into the dosing cup compartment 60 of the lower insert 56 (broadly, place the dosing cup in the box B). In the illustrated embodiment, the dosing cup placer 94 is configured to place two dosing cups D into the box B as the same time. The dosing cup placer 94 includes a dosing cup singulator 96 and a dosing cup transporter 98. The dosing cup transporter 98 is configured to pick up and remove the dosing cups D from the dosing cup singulator 96 and place the dosing cups in the box B. In the illustrated embodiment, the dosing cup transporter 98 comprises a robot such as a six-axis robotic arm, although other robots are within the scope of the present disclosure. For example, the dosing cup transporter 98 may comprise a selective-compliance-articulated robotic arm, a cylindrical robot, a delta robot, a polar coordinate robot, a vertically articulated robot, a Cartesian coordinate robot or any other suitable device. The dosing cup transporter 98 includes a dosing cup grabber (broadly, end-of-arm tooling) configured to selectively grab one or more dosing cups D to move the dosing cups. The dosing cup grabber may be configured to pick up one, or preferably more than one (e.g., two), dosing cups D at a time. In the illustrated embodiment, the dosing cup grabber includes two suction cups, each suction cup arranged to pick up one dosing cup D from the dosing cup singulator 96.

The dosing cup singulator 96 is configured to singulate or individualize a plurality of dosing cups D and position the singulated dosing cups in a position to be grabbed (and subsequently moved) by the dosing cup transporter 98. Because the dosing cup transporter 98 picks up two dosing cups D at once, the dosing cup singulator 96 includes two singulator lines 100. Each singualtor line 100 singulates one of the dosing cups D picked up by the dosing cup transporter 98. Each singulator line 100 defines a pickup position at the end thereof. The two pickup positions are spaced apart by the same distance as the suction cups on the dosing cup transporter 98 (which is also the same distance between the dosing cup compartments 60 in the lower insert 56 are spaced apart). The two singulator lines 100 are generally identical, so one will now be described with the understanding the description applies to both singulator lines. The singulator line 100 includes opposite first and second rails defining a dosing cup channel therebetween sized and shaped to guide the dosing cups D in a single-file line. The base of the channel is defined by a conveyor (e.g., conveyor belt) which moves the dosing cups within the channel toward the pickup position. It is appreciated that the same conveyor underlies both channels of the two singulator lines 100. Immediately preceding the pickup position are first and second stops 102, 104. Each stop 102, 104 is configured to contact or engage one dosing cup D to inhibit the dosing cups from moving with the conveyor. The each stop 102, 104 can be extended into the channel to engage the dosing cups D and retracted from the channel to permit the dosing cups to pass the respective stops. Each stop 102, 104 is operatively coupled to a prime mover, such as a linear actuator, to move the stops between the extended and retracted positions. To singulate a dosing cup D, the first stop 102 is retracted and the second stop 104 is extended. The conveyor is operated until the lead dosing cup D contacts the second stop. After, the first stop 102 is extended. The first stop 102 is positioned such that it engages the next subsequent dosing cup D after the lead dosing cup. With the first stop 102 extended, the second stop 104 retracts and the conveyor is operated to move the lead dosing cup to the pickup position. A stop engages the lead dosing cup D to position the lead dosing cup in the pickup position. While the conveyor is moving the lead dosing cup D to the pickup position, the first stop 102 remains extended preventing the subsequent dosing cup and all the dosing cups after it from moving with the conveyor. After the lead dosing cup D is in the pickup position, the lead dosing cup D is picked up by the dosing cup transporter 98. In one embodiment, the second stop 104 may extend after the lead dosing cup D is in the pickup position but before the lead dosing cup is picked up to act as a brace against which the dosing cup transporter 98 can push the lead dosing cup so that the suction cup grips the lead dosing cup. After the lead dosing cup D is removed from the pickup position, the second stop 104 extends (or remains extended). The first stop 102 then retracts and the conveyor is operated to move the new lead dosing cup toward the second stop 104, allowing the process to repeat for the next dosing cup D.

The dosing cups may be automatically or manually loaded into the respective singulator lines 100. In one embodiment, the dosing cup station 18 may include a capper which automatically applies a cap to each container of the dosing cup D before the dosing cups are placed in the dosing cup singulator 96.

After the one or more dosing cups D are placed in the box B, the carriage 50 supporting the box travels (downstream) along the pathway 48 to move the box to the box check station 20. After the dosing cup station 18 but before the box check station 20, the pathway 48 includes a first branch or return loop 48A which allows the carriage 50 to return back to the erector station 12 or lower insert station 14. For example, should the box B on the carriage 50 not be properly filled with the lower insert 56, the syringes S and/or the dosing cups D. The first return loop 48A also allows the carriages 50 to bypass the lower insert station 14, the syringe station 16 and the dosing cup station 18 should one or more of these stations be out of order.

The box check station 20 includes a workplace for an operator to manually check to make sure each box B has received the lower insert 56, the syringes S and the dosing cups D. The workplace also allows the operator to manually insert one or more of the lower insert 56, the syringes S and the dosing cups D should one or more of the lower insert station 14, the syringe station 16 and/or the dosing cup station 18 be out of order. Most often, the carriage 50 will move right through the box check station to the pharmaceutical container station 22.

Figure 15:
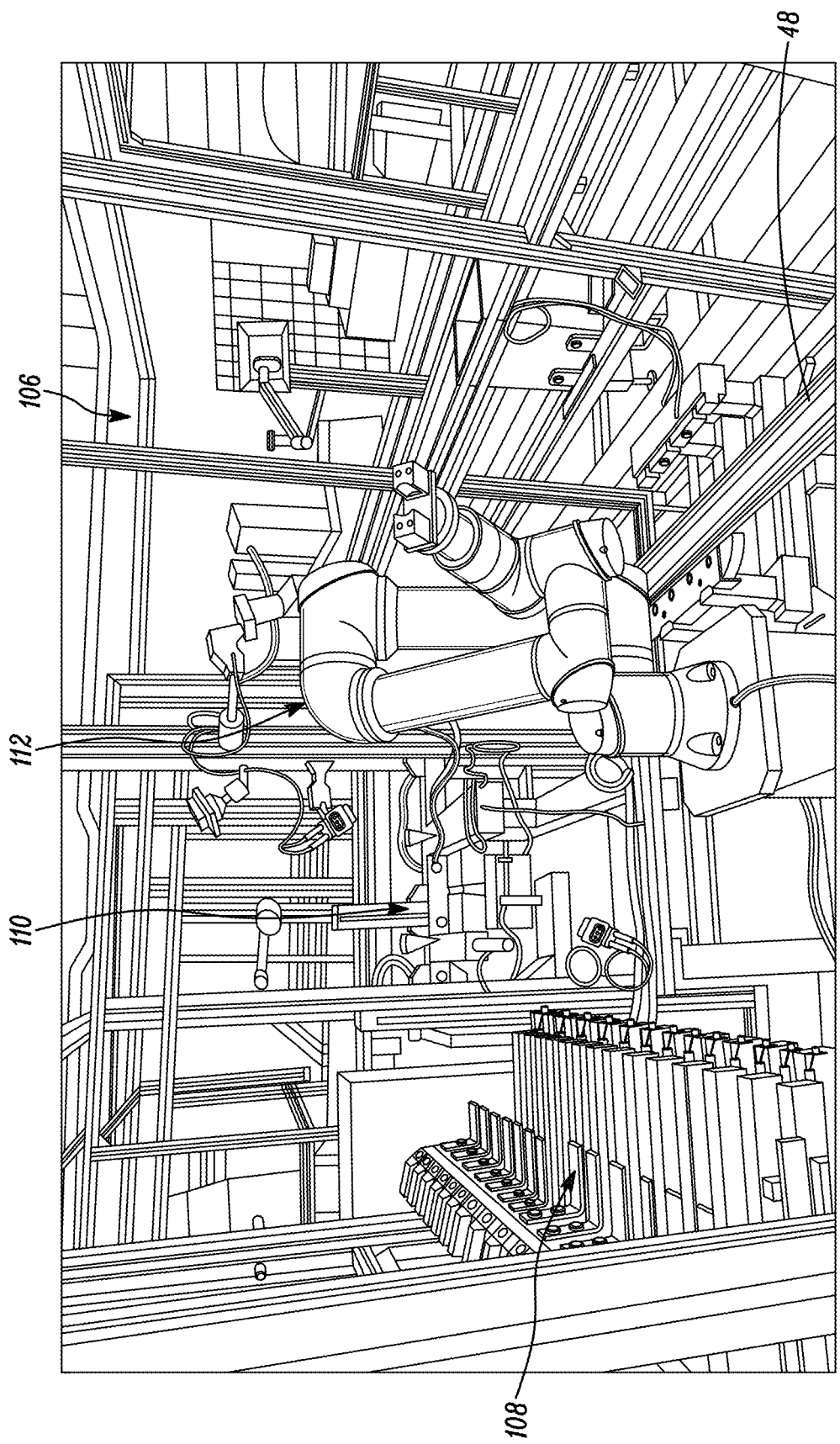
FIG. 15 is an image of a pharmaceutical container processing system of the pharmaceutical order processing system.
Figure 16:
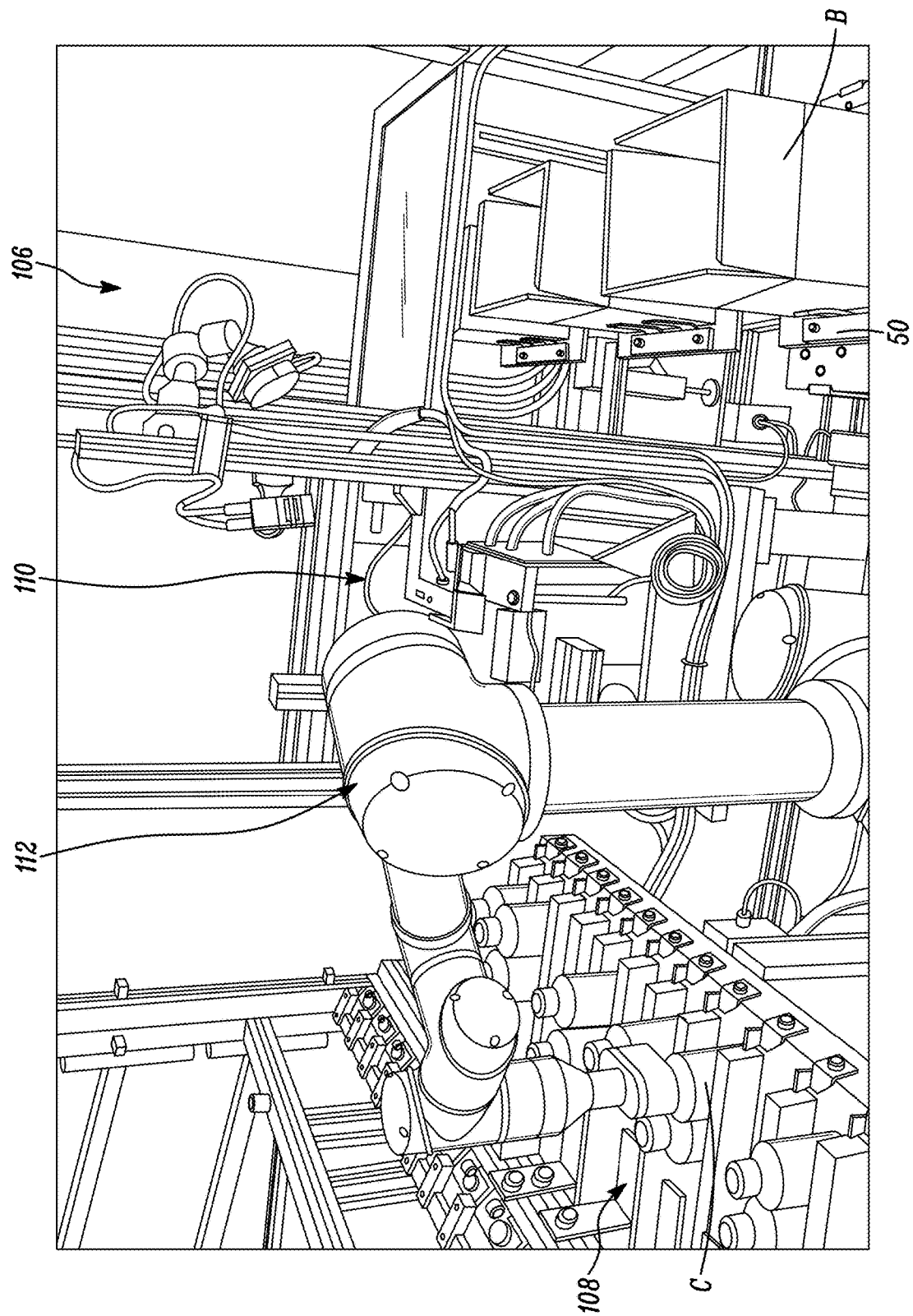
FIG. 16 is an image of the pharmaceutical container processing system.

Referring to FIGS. 15 and 16, the pharmaceutical container station 22 includes a pharmaceutical container placer 106 (broadly, a pharmaceutical container processing system). In the illustrated embodiment, the pharmaceutical container station 22 includes three pharmaceutical container placers 106. The three pharmaceutical container placers 106 are generally identical. The pathway 48 includes branch paths 48B for each pharmaceutical container placer 106. Each branch path 48B takes the carriages 50 off the main path and to one of the pharmaceutical container placers 106. One pharmaceutical container placer 106 will now be described with the understanding its description applies to all the pharmaceutical container placers.

The pharmaceutical container placer 106 is configured to place a pharmaceutical container C into a pharmaceutical container compartment 62 of the lower insert 56 (broadly, in the box B). The pharmaceutical container placer 106 includes a container repository 108, a labeler 110, and a container transporter 112. The container repository 108 receives and holds the pharmaceutical containers C and can hold many different types of pharmaceutical containers. The container repository 108 can be configured to hold pharmaceutical containers C of different shapes and of generally any size. For example, the container repository 108 can be configured for round bottles and square bottles, and any combination thereof. In one embodiment, the pharmaceutical containers C are manually loaded onto (e.g., into) the container repository 108 by an operator. The container repository 108 includes a plurality of channels sized and shaped so that the pharmaceutical containers C are arranged one after another (e.g., single file) in the channel. The container repository 108 includes a conveyor (e.g., conveyor belt) underlying the channels that moves the pharmaceutical containers C along the channels and to a pickup location where the pharmaceutical containers are picked up by the container transporter 112.

The container transporter 112 is configured to pick up and remove a pharmaceutical container C from the container repository 108 and place the pharmaceutical container in the box B. In the illustrated embodiment, the container transporter 112 comprises a robot such as a six-axis robotic arm, although other robots are within the scope of the present disclosure. For example, the container transporter 112 may comprise a selective-compliance-articulated robotic arm, a cylindrical robot, a delta robot, a polar coordinate robot, a vertically articulated robot, a Cartesian coordinate robot or any other suitable device. The container transporter 102 includes a container grabber (broadly, end-of-arm tooling) configured to selectively grab a pharmaceutical container C to move the pharmaceutical container.

The container transporter 112 moves the pharmaceutical container C past (e.g., along) the labeler 110 as the pharmaceutical container moves from the container repository 108 to the box B. The labeler 110 is configured to apply a label (e.g., a patient specific label) to the pharmaceutical container C. In one embodiment, the labeler 110 may print and then apply the label to the pharmaceutical container C. Labelers are generally known in the art, and thus a further description of the labeler is omitted herein. For example, the labeler 110 may be a pass through labeler that applies the label to the pharmaceutical container C as the container is moved through the labeler by another component. In this embodiment, the container transporter 112 moves the pharmaceutical container C to and along (e.g., through) the labeler 110. As the container transporter 112 moves the pharmaceutical container C along the labeler 110, the labeler applies the patient specific label to the container C (generally over the existing manufacturer's label). In one embodiment, the pharmaceutical container placer 106 may include a first identification scanner to scan the pharmaceutical container C before the label is applied to confirm the right container has been selected and a second identification scanner to scan the pharmaceutical container C after the label is applied to confirm the right label was applied and/or properly applied.

In one embodiment, the pharmaceutical container placer 106 picks the pharmaceutical container C and generates (e.g., prints) the patient specific label based off the identifier(s) from the machine-readable marking on the box B and/or the identification tag on the carriage 50. For example, in one embodiment, a scanner of the pharmaceutical container placer 106 obtains the identifier from the machine-readable marking on the box B or the identification tag on the carriage 50. The container transporter 112 then picks the pharmaceutical container C from the container repository 108 that is corresponds to the pharmaceutical order associated with the identifier. Similarly, the labeler 110 prints a label that corresponds to the pharmaceutical order associated with the identifier. In one embodiment, the pharmaceutical container placer 106 includes two scanners, one that obtains the identifier from the machine-readable marking on the box B and another that obtains the identifier from the identification tag on the carriage 50. The pharmaceutical container placer 106 may then compare the two identifiers to make sure the correct box B is still being supported by the correct carriage 50 (e.g., to make sure the box has not been removed and placed on a different carriage). Other stations may also obtain both identifiers to perform this verification as well.

After the one or more pharmaceutical containers C are placed in the box B, the carriage 50 supporting the box travels (downstream) along the pathway 48 to move the box to the manual stations 26. At this stage, the box B is filled with the lower insert 56, the syringes S, the dosing cups D, and the pharmaceutical container C as shown in FIG. 4. After the pharmaceutical container station 18 but before the first manual station 26, the pathway 48 includes a second branch or return loop 48C, which allows the carriage 50 to return back to the pharmaceutical container station 22. This allows a carriage 50 and corresponding box B to make multiple trips through the pharmaceutical container station 22 (e.g., visit other pharmaceutical container placers 106) should additional pharmaceutical containers C need to be placed in the box to fill the prescription order.

Figure 17:
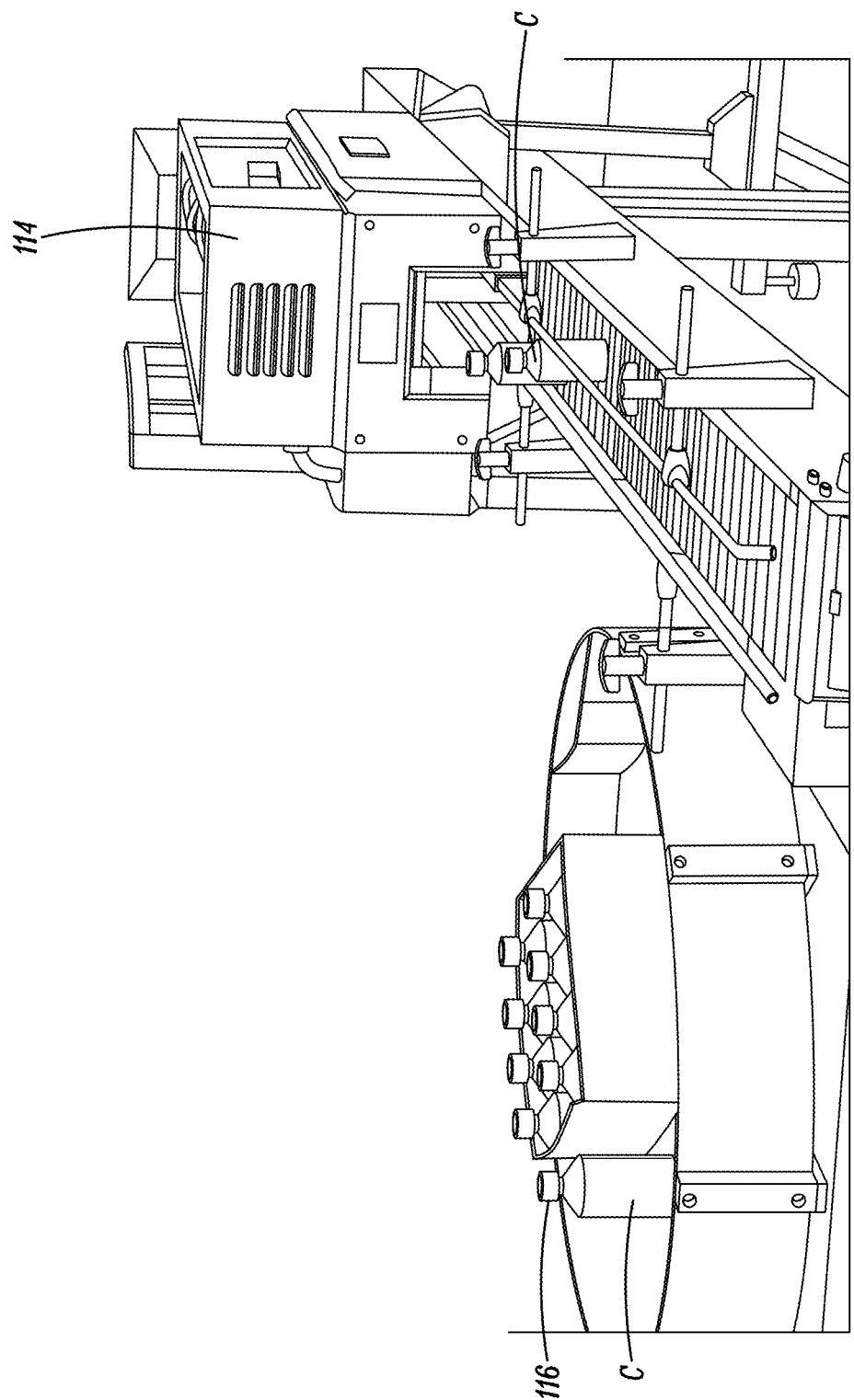
FIG. 17 is an image of a heat shrink sealer of the pharmaceutical container processing system.

Referring to FIG. 17, related to the pharmaceutical container station 22, the system 10 may include a filling station 24 (e.g., manual filling station). To the extent required, the manual filling station 24 allows workers to manually fill pharmaceutical containers C with the prescription before the pharmaceutical container C is placed on the container repository 108. It is understood not all pharmaceutical containers C will be manually filled at the filling station 24. For instance, some pharmaceutical containers C come from the manufacturer with the right amount of the prescription as mentioned above and these containers will not need to be manually filled before being placed on the container repository 108. For the pharmaceutical containers C that do need to be manually filled, the filling station 24 includes a workplace (e.g., tabletop) and a heat shrink sealer 114 for applying a heat shrink seal 116 around the cap of the manually filled pharmaceutical container.

Figure 18:
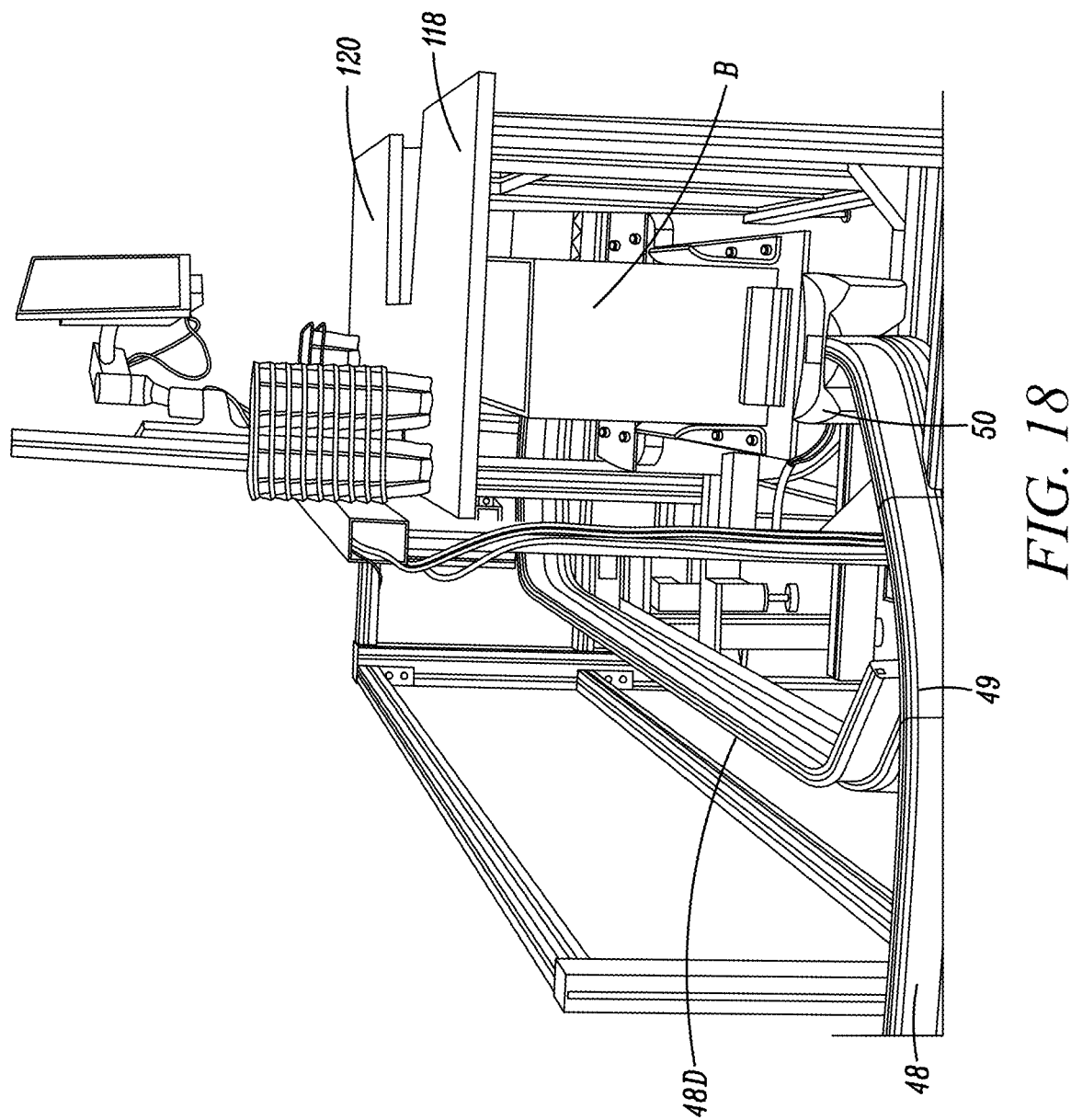
FIG. 18 is an image of a manual station of the pharmaceutical container processing system.
Figure 19:
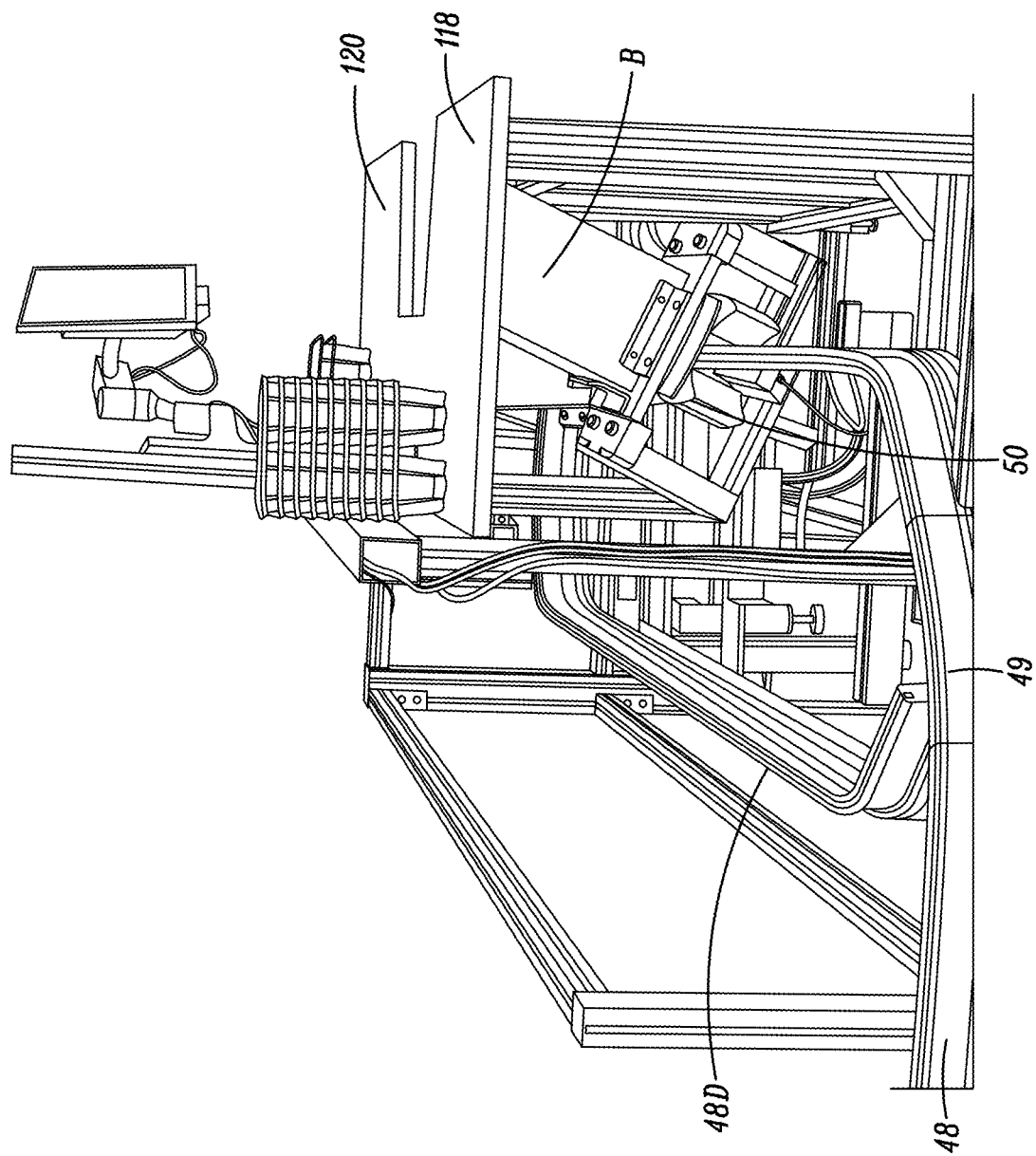
FIG. 19 is an image of the manual station.

Referring to FIGS. 3, 18 and 19, the system 10 may include a plurality of manual stations 26. In the illustrated embodiment, the system 10 includes five manual stations 26. Each manual station 26 may include a table 118 for an operator to work at. The pathway 48 includes a manual station branch 48D that extends under the table 118. The pathway 48 includes a connector segment 49 that rotates between different three different positions: one position connects the main path to the upstream end of the manual station branch 48D to allow carriages to move onto the manual station branch; a second position (shown in FIGS. 18 and 19) connects the main path to the downstream end of the manual station branch to allow carriage to move off the manual station branch and back onto the main path; and a third position allows the carriage to bypass the manual station branch and remain on the main path. The table 118 defines a box opening 120 arranged to align with a box B on a carriage 50 when the carriage stops at a position along the manual station branch 48D of the pathway 48. As shown in FIG. 19, the manual station branch 48D may include a tilter configured to tilt the carriage 50 and box B supported thereby at an angle, such as about 30 degrees from vertical, to make it easier for an operator to look into and access the box though the box opening 120.

The manual stations 26 allow different manual tasks to be performed. For example, referring to FIG. 3, in the illustrated embodiment, there are four different tasks performed across the manual stations 26. It is understood each manual station 26 can perform any of the tasks, but that generally each manual station with only perform one of the tasks at a time. One manual station 26A can be used to manually place a pharmaceutical container C in the box B. Another manual station 26B can be used to add first time patient information and literature and/or additional syringes S and dosing cups D. Another manual station 26c can be used to manually correct any errors that occur along the system 10 (e.g., a pharmaceutical container C was placed in the wrong box B). Another manual station 26D can be used by pharmacist to manually verify the pharmaceutical container C placed in the box B is the correct container for the corresponding patient's prescription order. In the illustrated embodiment, there are two manual stations 26D. It is understood other tasks may be performed at the manual stations.

After the manual stations 26, the carriage 50 supporting the box B travels (downstream) along the pathway 48 to move the box to the upper insert station 28. After the manual stations 26 but before the upper insert station 28, the pathway 48 includes a third branch or return loop 48E which allows the carriage 50 to return back to one or more of the manual stations 26. This allows a carriage 50 and corresponding box B to make multiple trips through the manual stations 26. For example, if a pharmacist at one of the verification manual stations 26D determines an error occurred, the carriage 50 can be directed to the manual correction manual station 26c via the third return loop 48E in order to be manually corrected.

Figure 20:
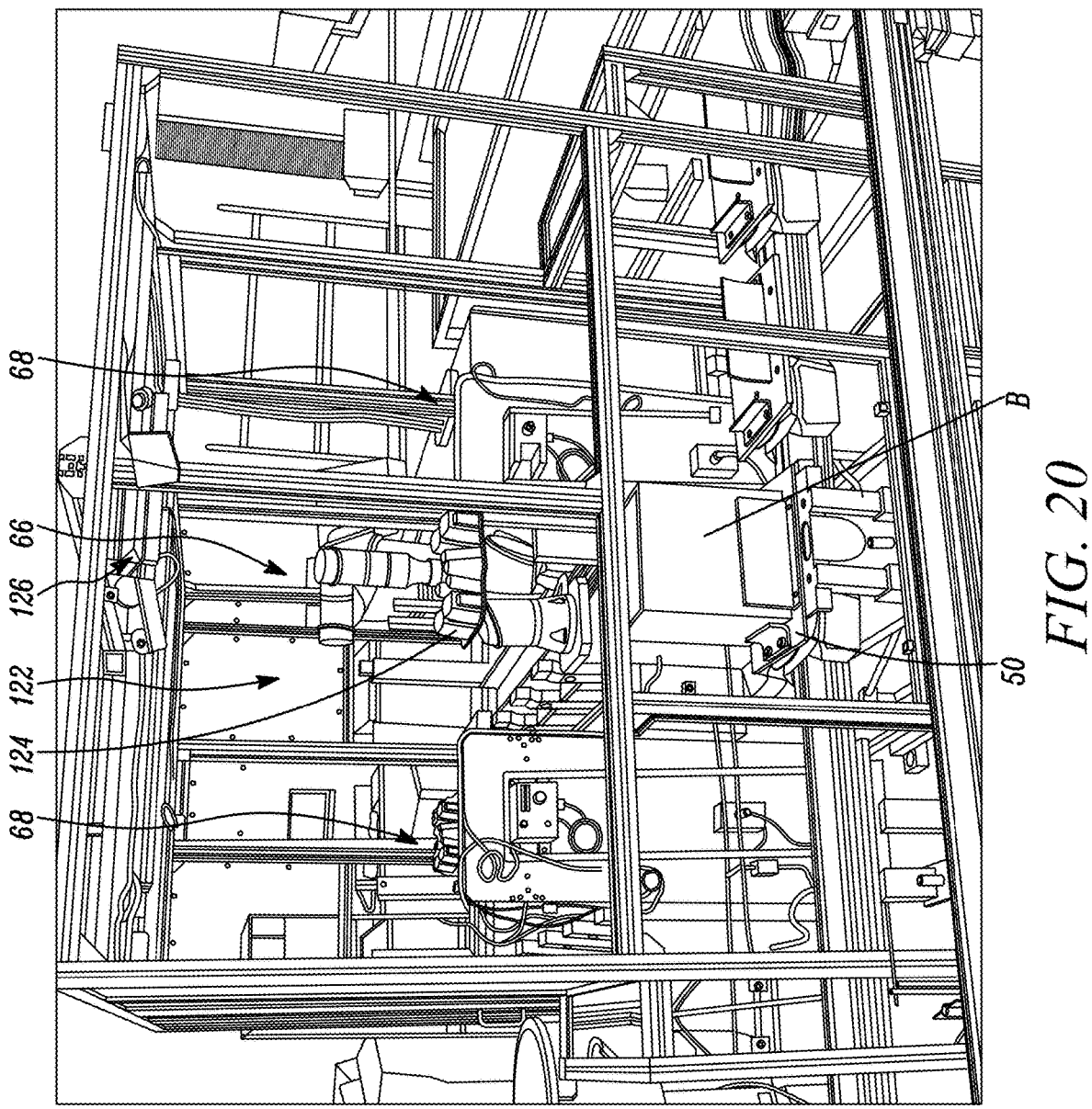
FIG. 20 is an image of an upper insert placer of the pharmaceutical order processing system.

Referring to FIG. 20, the upper insert station 28 includes an upper insert placer 122. The upper insert placer 122 is configured to place an upper insert 124 into the box B (when the carriage 50 carrying the box is at the upper insert station 28). When placed in the box B, the upper insert 124 generally encloses the elements (e.g., syringes S, dosing cups D, pharmaceutical container(s) C) placed in the lower insert 56. The upper insert 124 may include one or more syringe compartments, one or more dosing cup compartments and/or one or more pharmaceutical container compartments that align with the corresponding compartments of the lower insert 56 when the upper insert is inserted into the box B to surround and enclose the elements in the compartments. The upper insert placer 122 is generally identical to the lower insert placer 64, and thus like reference numerals are used to indicate like components. Accordingly, the above descriptions regarding the lower insert placer 64 also apply to the upper insert placer 122. For example, the upper insert placer 122 includes an insert transporter 66 configured to move the upper insert 124 into the box B. The main difference between the upper insert placer 122 and the lower insert placer 64 is that the upper insert grabber (broadly, end-of-arm tooling) of the insert transporter 66 configured to selectively grab an upper insert 124 instead of a lower insert 56. In one embodiment, the upper insert station 28 may include a camera 126 arranged to be positioned above the box B and the carriage 50 to take a picture of the inside of the box (e.g., the syringes S, the dosing cups D, and the pharmaceutical container(s) C) for record keeping purposes before the upper insert 124 is inserted into the box.

Figure 6:
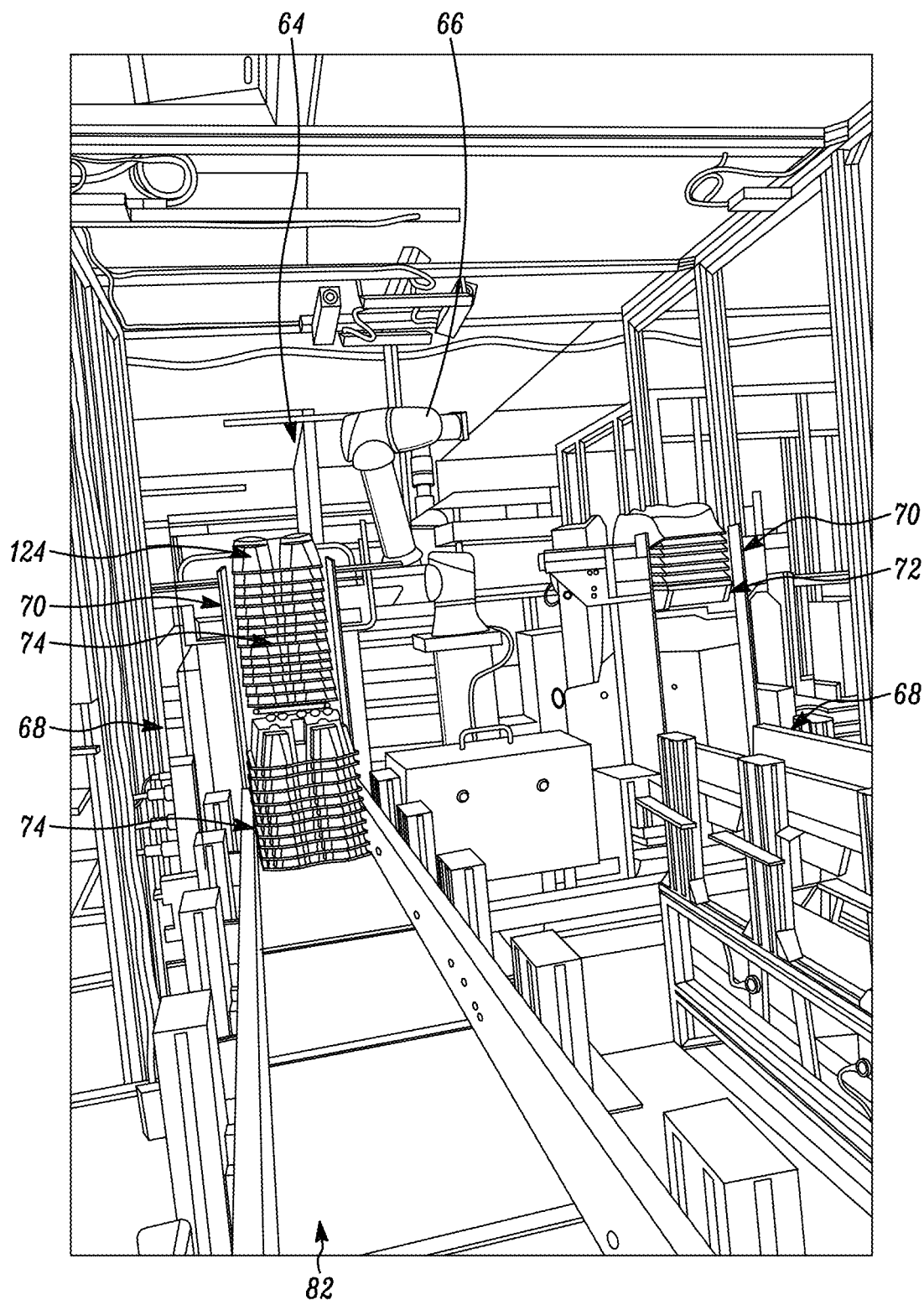
FIG. 6 is an image of insert supply lines of the lower insert placer.
Figure 7:
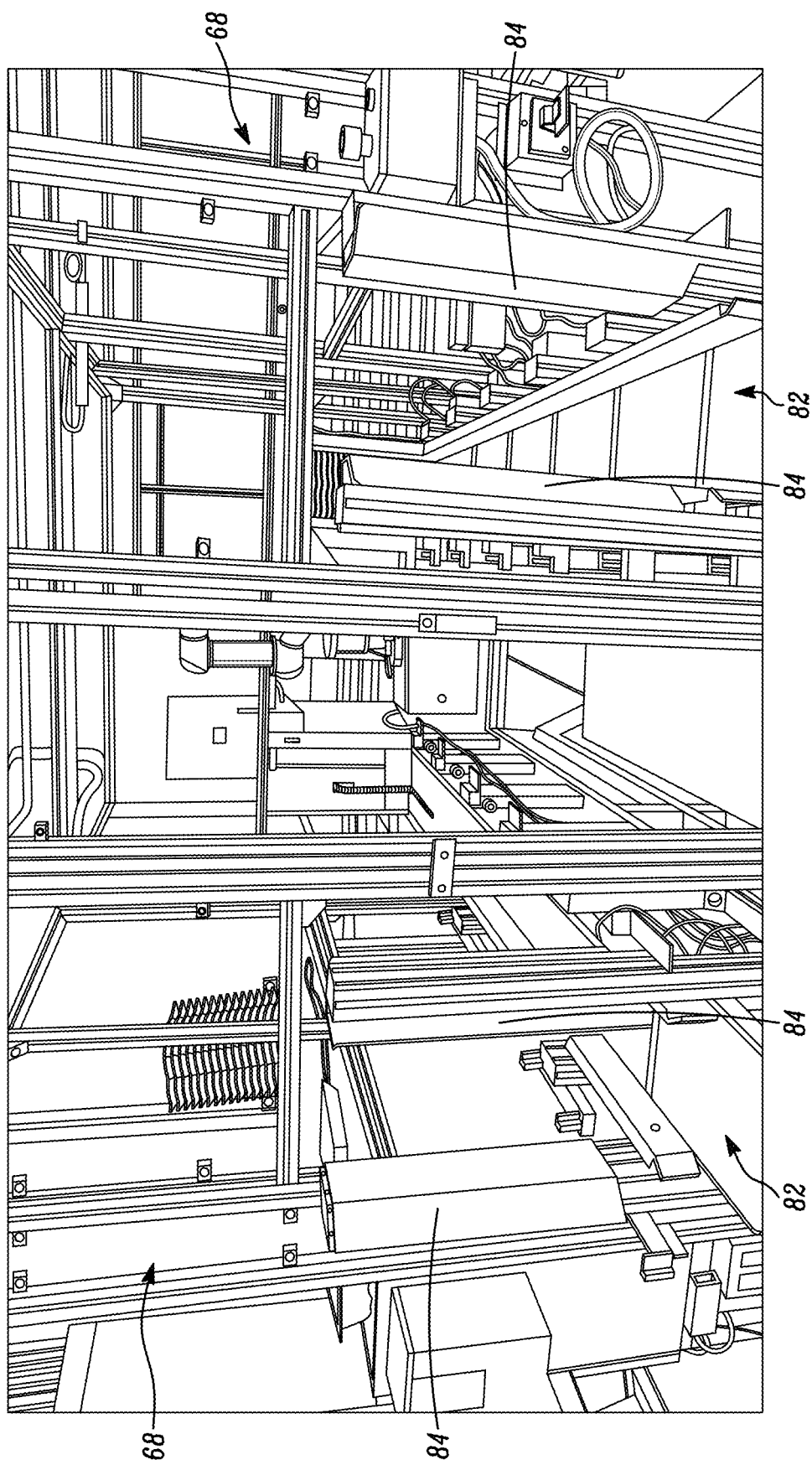
FIG. 7 is an image of the insert supply lines.
Figure 8:
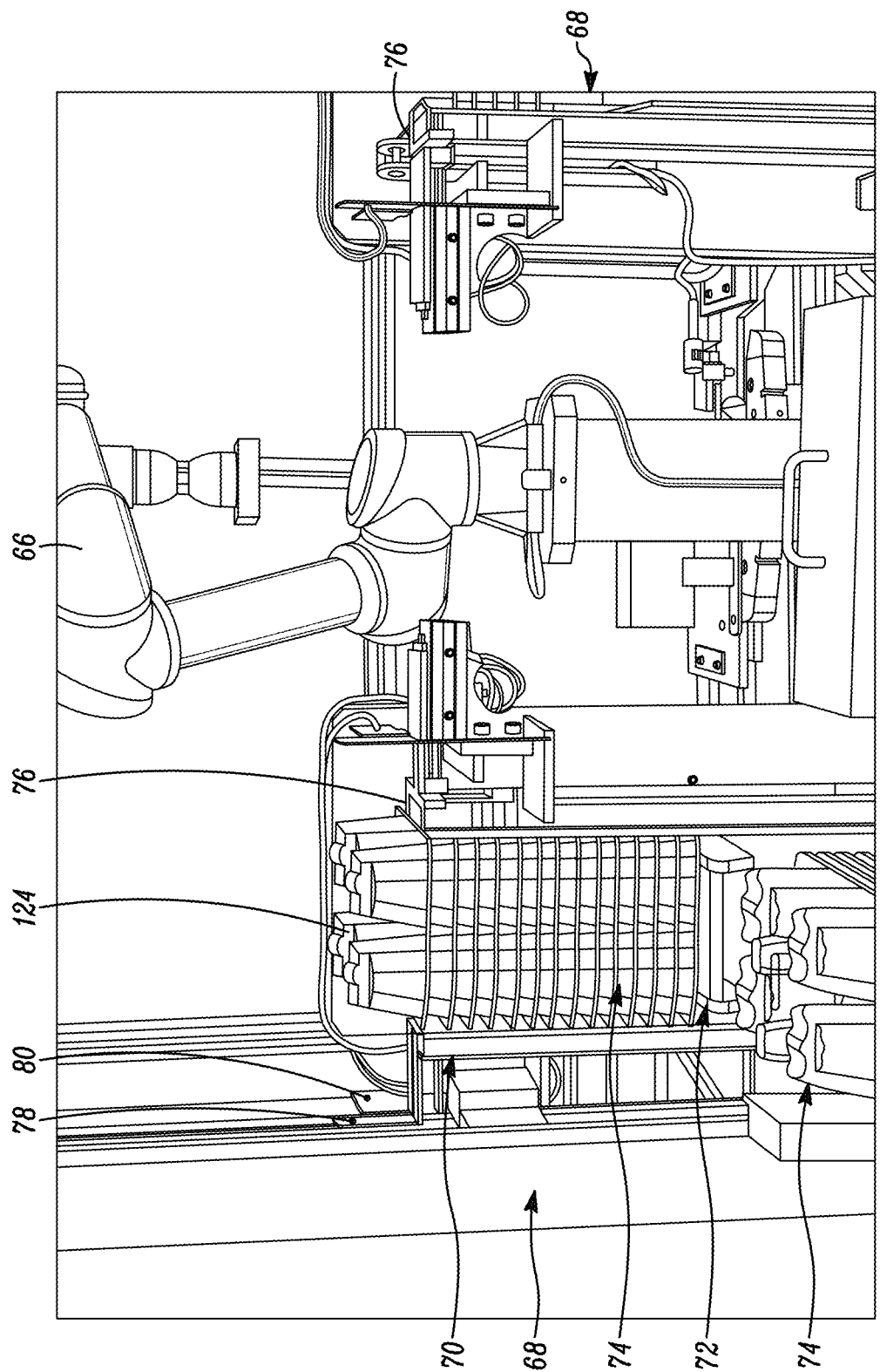
FIG. 8 is an enlarged image of the insert supply line.
Figure 9:
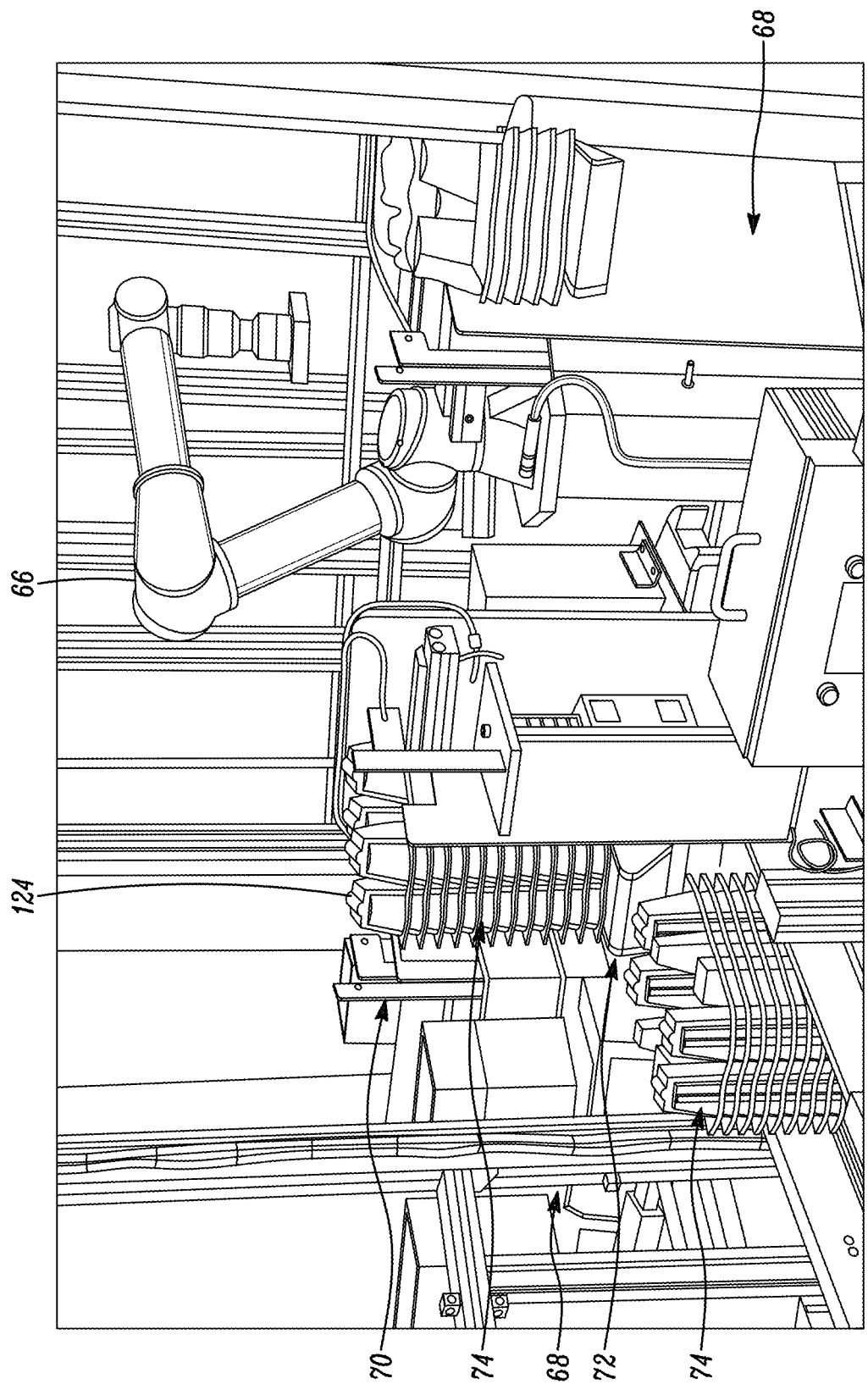
FIG. 9 is an enlarged image of the insert supply line.

It is appreciated that FIGS. 6, 8 and 9 that were referred to during the discussion regarding the lower insert placer 64 show upper inserts 124. However, since the lower and upper insert placers 64, 122 are generally identical, it is understood that the placers are constructed and operate in generally the same way. Accordingly, when discussing the construction and operations of the lower and upper insert placers 64, 122, references to the lower and upper inserts 56, 124 are generally interchangeable.

After the upper insert 124 is placed in the box B, the carriage 50 supporting the box travels (downstream) along the pathway 48 to move the box to the manual paper insert station 30 and automatic paper insert station 32.

Referring back to FIGS. 1-3, the system 10 includes a manual paper insert station 30 and an automatic paper insert station 32. The system 10 may include either the manual paper insert station 30 or the automatic paper insert station 32. The manual paper insert station 30 includes one or more printers that print literature (e.g., prescription instructions, etc.) associated with the prescription order corresponding to the box B. An operator can then take the printed literature and place it in the box B. In one embodiment, the printers print the literature in response to the scanning (manually or automated), using a scanner, the machine-readable marking on the box B and/or the identification tag of the carriage 50. The printers print the literature corresponding to the prescription order associated with the identifier. The automatic paper insert station 32 also printers and a literature placer that places the printed literature from the printers in the box B. The automatic paper insert station 32 may also include a scanner that obtains the identifier(s) from the machine-readable marking and/or identification tag to print the literature, as described above. It is understood the carriage 50 and its box B would generally stop at only one of the manual paper insert station 30 or the automatic paper insert station 32, although in some embodiments the carriage and box may stop at both. Other ways of adding the literature to the box B are within the scope of the present disclosure.

After the literature is placed in the box B at the manual paper insert station 30 and/or the automatic paper insert station 32, the carriage 50 supporting the box travels (downstream) along the pathway 48 to move the box to the weight station 34.

The weight station 34 includes a scale that weighs the box B. The actual weight of the box B as measured by the scale is compared against a predicted weight generated based on the prescription order. The predicted weight is generated by adding the predicted weight of the box and each element that is supposed to be contained therein (e.g., syringes S, dosing cups D, one or more pharmaceutical containers C, literature, etc.) based on the prescription order. If the actual weight is too different from the predicted weight (e.g., outside a predicted weight range), the system 10 flags the box B and the carriage 50 supporting the box is redirected to the manual correction station 26c via a fourth return loop 48F and the third return loop 48E to be manually inspected and corrected if needed. In one example, part of the carriage 50 may be separable from the remainder of the carriage 50. For example, the carriage 50 may include or carry a plate on which the box B is carried or may carry another container that can be lifted and separated from the carriage 50 at the weight station 34. The weight station 34 can sense the tare weight and the controller can use this tare weight by later subtracting the tare weight from a measured gross weight of the container, box, plate, etc. that is carrying product on the carriage to obtain a net weight of the package being carried by the carriage 50. This net weight can be compared with the predicted weight as described above (e.g., the net weight can be the actual weight described above).

After the box B passes the weight inspection at the weight station 34, the carriage 50 supporting the box travels (downstream) along the pathway 48 to move the box to the unloading station 36.

At the unloading station 36, the box B is removed from the carriage 50. This may be done manually or automatically with a box transporter. The box transporter can comprise a robot such as a six-axis robotic arm, although other robots are within the scope of the present disclosure. For example, the box transporter may comprise a selective-compliance-articulated robotic arm, a cylindrical robot, a delta robot, a polar coordinate robot, a vertically articulated robot, a Cartesian coordinate robot or any other suitable device. The box transporter includes a box grabber (broadly, end-of-arm tooling) configured to selectively grab the box B to move the box. At this point, the carriage 50 and the box B diverge from each other. The carriage 50, now empty, returns along the main path of the pathway 48 to the erection station 12 to receive a new box B to repeat the process. The box B, unloaded from the carriage 50, is moved to the box closing station 38.

The box closing station 38 includes a box closer 128 that receives the box B from the unloading station. The box closer 128 is configured to close the box B. The box closer 128, as generally known in the art, may fold the upper flaps of the box B down and tap them shut to close the box.

The system 10 includes a box conveyor 130 that carries the box B from the box closing station 38 to the shipping label station 40. The shipping label station 40 may include a printer that prints the shipping label and a shipping label placer that places the printed shipping label on the box B. The shipping label may be created based off scanning the machine-readable marking on the box B in generally the same manner as described above with the creation of the literature. After the shipping label station 40, the box conveyor 130 continues to carry the box B to the shipping label verification station 42. The shipping label verification station 42 can include a scanner that scans the shipping label to confirm the shipping label is readable (e.g., no errors occurred when applying the shipping label to the box B). The shipping label verification station 42 may also scan, with the same or different scanner, the machine-readable marking to obtain the identifier to confirm the applied shipping label is on the correct box B. The box conveyor 130 then transports the box B to the collection station 44 where the box is ready to be shipped. For example, an operator may manually stack the box B on a shipping pallet. In another embodiment, the collection station 44 may include a palletizer that removes the box B from the box conveyor and stacks the box on a pallet.

The above mentioned process of the box B traveling from the erector station 12 to the collection station 44 repeats itself for each box (e.g., each prescription order) processed by the system 10. It is understood that the stations may be operating generally simultaneously. For example, the lower insert placer 64 can be placing a lower insert 56 in one box B while the pharmaceutical container placer 106 is placing a pharmaceutical container C in another box.

The system 10 may include a control system for controlling the operations and processes of the system as described herein. In one example, the control system includes a system controller (broadly, a computer) for controlling the operation of the system 10. The control system can be a pharmacy system controller, e.g., as shown and described in U.S. Pat. Nos. 10,303,854 and 9,697,335, the entireties of which are hereby incorporated by reference. The controller systems and methods can control the components as described herein and dispense the pharmaceutical containers C (e.g., bottles of liquid medicines). The system controller (e.g., a pharmaceutical order processing system controller) controls and/or is in communication with the different components of the system 10, such as individual component controllers (e.g., the insert placer controller). The system controller includes a CPU or processor (e.g., a pharmaceutical order processing system processor) and RAM or memory (broadly, non-transitory computer-readable storage medium). Generally, the system controller controls and operates the various components (e.g., lower insert placer 64, conveyor 46, pharmaceutical placer 64, etc.) of the system 10. Broadly, the memory includes (e.g., stores) processor-executable instructions for controlling the operation of the system 10 and the components thereof. The instructions embody one or more of the functional aspects of the system 10 and the components thereof (as described herein), with the processor executing the instructions to perform said one or more functional aspects. The components of the system 10 may be in wired or wireless communication with the controller. Other configurations of the control system are within the scope of the present disclosure.

Various embodiments described herein can provide a small footprint automated pharmacy with different types of redundancy, e.g., multiple supply lines to a single robotic mover and workstations 26 that can be modified to different tasks. The workstations 26 can be assigned to perform the various tasks as described in U.S. Provisional Patent Application No. 63/272,667.

The carriages 50 on the pathway 48 can be tracked and controlled according to the disclosure in U.S. Provisional Patent Application No. 63/272,671, which is hereby incorporated by reference.

Figure 21:
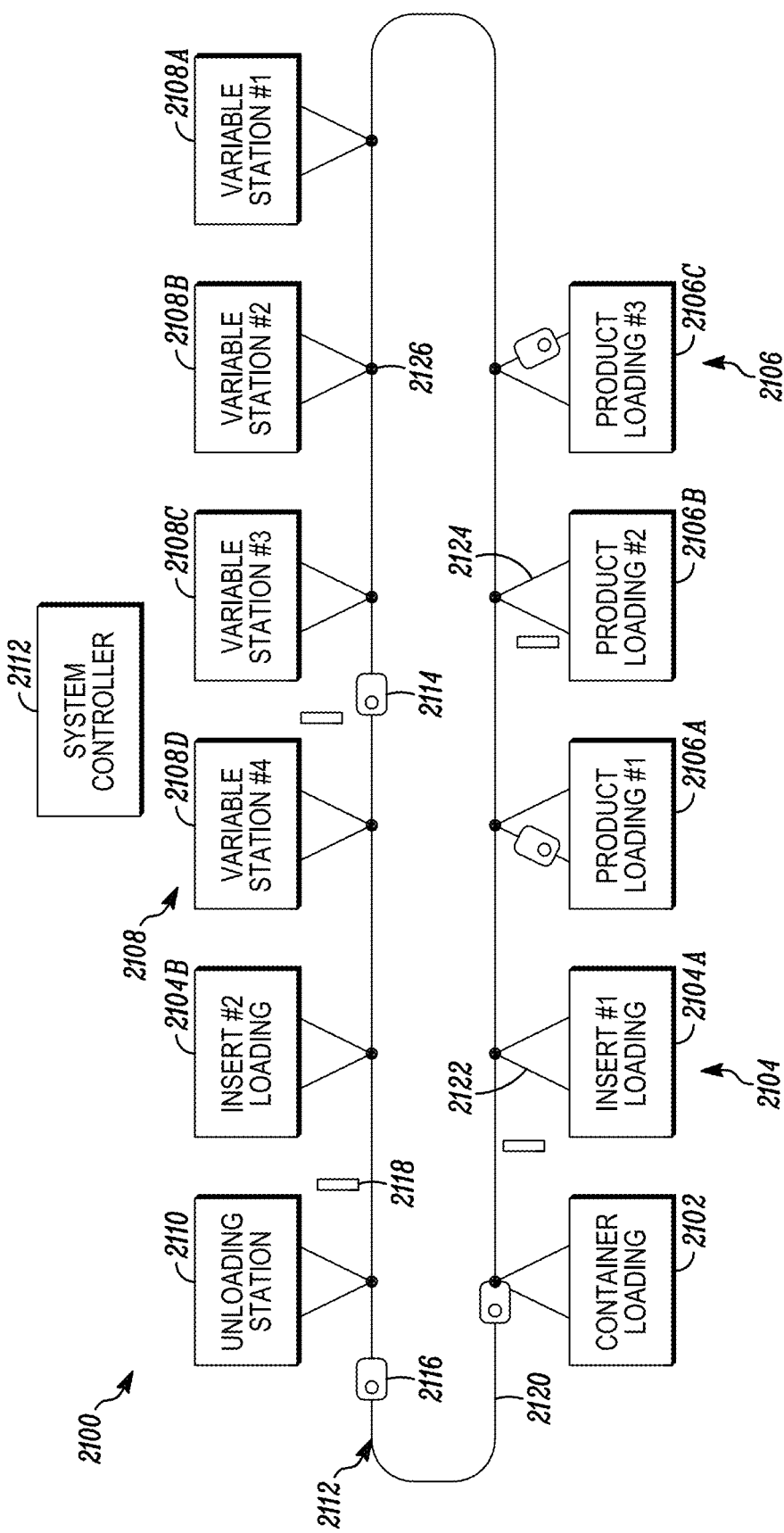
FIG. 21 illustrates one example of a packing system.

FIG. 21 illustrates another example of a packing system 2100. The packing system includes several stations 2102, 2104, 2106, 2108, 2110 interconnected with each other by carrier routes 2112. The stations 2102, 2104, 2106, 2108, 2110 may represent one or more of the stations or stops described above in connection with the system 10. Several carrier devices 2114 may represent the carriages, carriers, box conveyors, etc. (50), described above, and may move along the routes to and/or between the stations. More or fewer stations and/or carrier devices can be provided. Different tasks can be performed by the stations other than what is described or illustrated herein. The carrier devices can include or represent platforms or containers on which other containers are placed with packing and products placed into the container before the container is closed and readied for shipping.

In the illustrated example, the station 2102 ("Container Loading" in FIG. 21) is referred to as a container loading station where containers (e.g., a box, bag, or the like) are placed onto or into the carrier devices. The containers may be placed onto or into the carrier devices by robotic equipment included in the container loading station. Alternatively, the containers may be manually placed onto or into the carrier devices. The container loading station 2102 optionally can represent the box erector station 12 in one example. The stations 2104 ("Insert #1 Loading" and "Insert #2 Loading" in FIG. 1) are insert loading stations that can include a first insert loading station 2104A and a second insert loading station 2104B. These insert loading stations can place packaging material, such as cardboard supports or components that protect the product (e.g., medication), etc., in the container, by robotic equipment included in the stations. In one example, the insert loading stations 2104 can represent one or more of the lower insert station 14, the upper insert station 28, and/or the manual paper insert station 30 described above.

The stations 2106 ("Product Loading #1," "Product Loading #2," and "Product Loading #3" in FIG. 1) are product loading stations that can include first, second, and third product loading stations 2106A, 2106B, 2106C. These product loading stations can place a product (e.g., a container of medication) into the container on the carrier device that is in the corresponding station, by robotic equipment included in the stations. The product loading stations 2106 can represent one or more of the syringe station 16, the dosing cup station 18, the box check station 20, the pharmacy container station 22, the filling station 22, or the like.

The stations 2108 ("Variable Station #1," "Variable Station #2," "Variable Station #3," and "Variable Station #4" in FIG. 1) are variable stations that can include first, second, third, and fourth variable stations 2108A, 2108B, 2108C, 2108D. These variable stations can perform a variety of tasks, such as inspection or quality control of the tasks performed by other stations; placement of literature into the container (e.g., medication instructions), placement of ancillary devices such as syringes, dosing vials, medication, etc. (for help in administering the medication to the patient), literature (e.g., medication dosing instructions and/or warnings), etc.; the picking and placing of containers, packaging, inserts, product, ancillary devices, or the like; the correction of any containers having incorrect inserts, packaging, inserts, product, ancillary devices, etc.; or another task. As described herein, a system controller 2112 can change which tasks are performed by the variable stations to keep up with demand, reduce bottlenecks or backlogs at other stations, provide for manual or in-depth automatic inspection of a packaged container, or the like. The tasks performed at the variable stations can be performed manually by one or more persons. Alternatively, the variable stations may include robotic equipment that automatically performs the tasks at these stations. In one example, each of the variable stations can represent one or more of the box erector station 12, the lower insert station 14, the syringe station 16, the dosing cup station 18, the box check station 20, the pharmacy container station 22, the filling station 24, the manual station 26, the upper insert station 28, the manual paper insert station 30, the automatic paper insert station 32, the weight station 34, the unloading station 36, the box closing station 38, the shipping label station 40, the shipping label verification station 42, and/or the collection station 44.

The station 2110 ("Unloading Station" in FIG. 1) is an unloading station, such as the unloading station 36, where the container on or in a carrier device is removed from the packing system. For example, after a container is correctly filled with the packaging, optional inserts, product(s), etc. and approved through inspection, the container can be removed from the carrier device at the unloading station. The container may then be sent for shipping or other delivery to a customer.

The carrier devices can include one or more motors to self-propel the carrier devices along the routes. The carrier devices also can include device controllers 2116 that communicate with the system controller via communication devices 2118 at various locations within the packing system. There may be many more or fewer communication devices in the packing system than what is shown in FIG. 21. Additionally, one or more of the stations can each include one or more communication devices in the station(s). In one embodiment, there is a communication device that is both upstream of one station and downstream from a prior station (along the loop of the routes) for each of the stations.

The system controller and the device controllers each can represent hardware circuitry that includes and/or is connected with a processor or more than one processor (e.g., one or more microcontrollers, integrated circuits, field programmable gate arrays, microprocessors, etc.) that perform the operations described in connection with the respective system controller or device controllers. The system controller can be connected (via wired and/or wireless connections) with the communication devices that are off-board the carrier devices. The device controllers optionally can include or be connected with one or more of the communication devices that are onboard the carrier devices to enable the device controllers to communicate with the system controller via the onboard and off-board communication devices.

The communication devices may optically communicate information with the device controllers. For example, the communication devices may communicate using infrared light, visible light, or the like. Alternatively, the communication devices may communicate information with the device controllers via other wireless and/or wireless connections, such as electromagnetic waves, signals conducted along cables or wires, etc. Using optical communications, however, can reduce or eliminate the interference that may otherwise occur with other wireless communications. For example, the optical communications can rely on line-of-sights between the communication devices, which can limit communication with each off-board communication device to only a single carrier device at a time.

The routes can extend among and/or between the stations in one or more loops 2120 and include off-ramps 2122 and on-ramps 2124 between the loops and the stations. The term ramps can refer to portions of the routes that are coplanar with a remainder of the routes (or the routes outside of the ramps and/or loops). That is, the ramps 2122, 2124 may not be angled up or down relative to the routes outside of the ramps. Alternatively, one or more of the ramps 2122, 2144 may be oriented at an incline or decline relative to other routes. The routes include switches 2126 at intersections between the loops and the off-ramps and between the loops and the on-ramps. The switches 2126 are controlled by the system controller to direct carrier devices from the loop to the station via an off-ramp, to direct carrier devices from the station to the loop via an on-ramp, and/or to direct the carrier devices to remain on the loop and bypass a station. For example, each switch can have different states or positions: an incoming state where the switch connects the loop with an off-ramp to lead the carrier device into the station, an outbound state where the switch connects the loop with an on-ramp to lead the carrier device out of the station and back to the loop, and a bypass state where the switch keeps the carrier device on the loop and prevents the carrier device from moving onto an off-ramp to a station. The carrier devices may include internal motors that allow the carrier devices to self-propel along the routes as dictated by the states of the switches 2126, which are controlled by the system controller.

The system controller can change which stations are active and which are inactive by communicating with the stations and/or the carrier devices. For example, the system controller can communicate an active indicator to the switches 2126 and/or carrier devices that indicate that a station is active (where the station is operational to perform the assigned task). The system controller can communicate indicators to the switches 2126 that instructs the switches 2126 to change to designated or indicated states or positions. The system controller can communicate indicators to the carrier devices that instruct the carrier devices to move to locations (e.g., switches 2126, stations, communication devices, etc.) identified in the indicators. Upon receiving such communication indicating that a station is inactive, the switch can change to the bypass state to prevent the carrier devices from moving into an inactive station and/or the carrier device can stay on the loop part of the routes to bypass the inactive station(s).

The system controller can change what task is being performed by one or more of the stations. For example, the system controller can direct the first variable station to perform the pick task (where product, ancillary devices, packaging, etc. is placed into the container on or in the carrier device), the second variable station to perform the correction or re-work task (where a missing or incorrect product, ancillary device, packaging, etc., is removed or placed into the container), the third variable station to perform the inspection task (where the contents of the container in or on a carrier device are inspected), and the fourth variable station to be inactive. The system controller can later change the second variable station to perform the pick task and the fourth variable station to perform the inspection task. The tasks performed by these stations can be manually changed as needed based on operator input to the system controller. For example, if too many (e.g., more than a threshold number) of carrier devices are waiting in line for a pick station and/or carrier devices are waiting too long (e.g., longer than a threshold period of time) to have a task performed by a station, then an operator can provide input to the system controller that changes which tasks are performed by the variable stations to reduce the number of carrier devices waiting for a task. Alternatively, the tasks performed by these stations can be automatically changed as needed by the system controller. For example, if too many of carrier devices are waiting in line for a pick station and/or carrier devices are waiting too long to have a task performed by a station, then the system controller can change which tasks are performed by the variable stations to reduce the number of carrier devices waiting for a task. The manual and/or automatic modification of tasks performed by the variable stations can be used load balance the work or tasks to be completed across all or several of the variable stations of the same type, including the shuttles or carriers headed to the stations, and not just the tasks to be performed in an immediate queue of a station.

Figure 22:
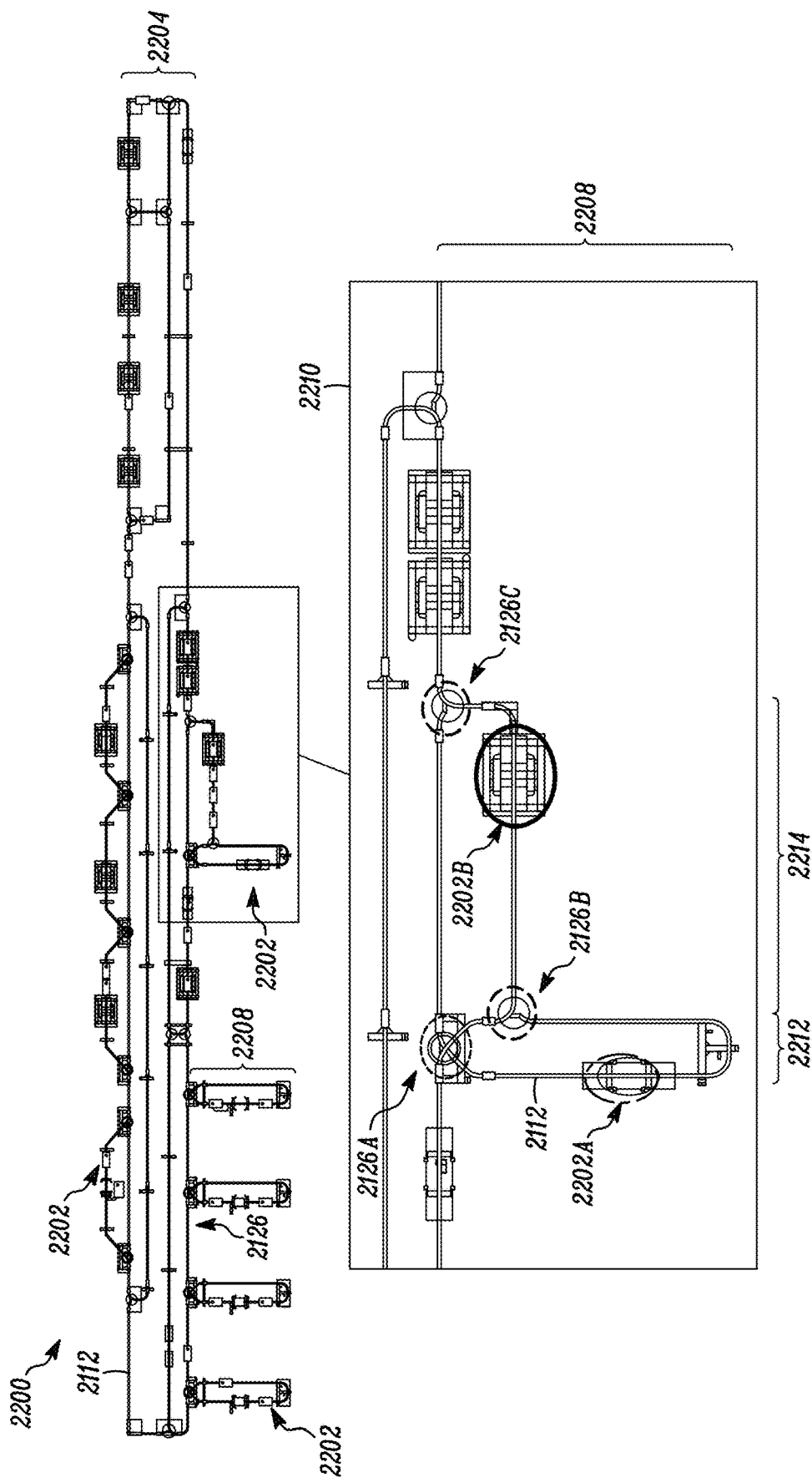
FIG. 22 illustrates another example of a packing system.

FIG. 22 illustrates another example of a packing system 2200. The packing system 2200 can represent another example of the packing system 10 and/or 2100 shown in FIGS. 1, 2, and 21, and as described herein. The packing system 2200 may include several stations 2202, which can represent one or more, or any combination of two or more, of the stations 12, 14, 16, 18, 20, 22, 24, 26, 28, 30, 32, 34, 36, 38, 40, 42, 44, 2102, 2104, 2106, 2108, and/or 2110. The stations 2202 may be interconnected with each other by the carrier routes 2112 described above. The carrier devices 2114 may move along the routes to and/or between the stations, also as described above. More or fewer stations and/or carrier devices can be provided. Different tasks can be performed by the stations other than what is described or illustrated herein.

The packing system 2200 may have a primary loop 2204 formed by the routes 2112 and secondary loops 2206, 2208 formed by the routes and connected with the primary loop 2204 by the switches 2126. The carriers or carriages may move along the primary loop 2204 and be directed into one or more of the secondary loops 2208 as the carriers or carriages move through the switches 2126 that connect the secondary loops 2208 with the primary loop 2204. Each of the secondary loops 2208 may have one or more of the stations described herein.

The controller can direct the switches 2126 to change states, orientations, or positions to direct carriages entering into the switches 2126 from the primary loop 2204 to leave the primary loop 2204 and enter into the corresponding secondary loop 2208 (for operation(s) to be performed by one or more stations within the secondary loop) and/or to direct carriages entering into the switches 2126 from secondary loops to leave the secondary loops and return into the primary loop (e.g., to reach another secondary loop).

A portion of the packing system 2200 is shown in a magnified view 2210 in FIG. 22. This portion of the packing system 2200 includes one of the secondary loops 2208 referred to as a throughput loop 2208. This throughput loop 2208 may be used to increase throughput or the speed at which carriages 2114 are able to move through certain stations 2202. Some types of stations 2202, such as the insert stations 14, 28, 32, manually operated stations 26, 30, etc., may create backups or bottlenecks in the packing system 2200 that reduce the throughput or speed at which carriages 2114 are able to move through the stations 2202. For example, some stations 2202 that print private health information (PHI) onto labels or inserts placed into the carriages 2114 may take longer to complete printing of the labels or inserts, and may not be able to move onto printing any information for another carriage 2114 before the printing and insertion of the information for a current carriage 2114 is fully complete. Backups or bottlenecks also may occur when a station 2202 fails or is out of supplies. Carriages may have to move more slowly, or stop, during movement along the primary loop 2204 and/or one or more of the secondary loops 2208 while the operations causing the bottleneck are completed, materials are replenished at stations 2202, stations 2202 are repaired, etc.

The throughput loop 2208 may reduce or alleviate the bottlenecks or backups in the packing system 2100 by providing alternate stations 2202 and paths or loops within the throughput loop 2208. For example, the throughput loop 2208 may include multiple sub-loops 2212, 2214 within the throughput loop 2208. These sub-loops 2212, 2214 may include similar, identical, or different stations. For example, the sub-loop 2212 can include a station 2202A, which may represent a manual paper insert station 30, and the sub-loop 2214 may include a station 2202B, which may represent an automatic paper insert station 32. Alternatively, the stations 2202A, 2202B may be the same type of station (e.g., both are manual paper insert stations 30).

In operation, the controller 2112 can direct carriages 2114 along either of the sub-loops 2212, 2214 responsive to throughput through one or more of the sub-loops 2212, 2214 become slow or stopping. For example, if the station 2202A is completing the printing and insertion of inserts more slowly than the station 2202B, if there is a longer line of carriages 2210 waiting for the station 2202A than the station 2202B, or the like, the controller 2212 can control switches 2126 within the throughput secondary loop 2208 to direct more or all incoming carriages 2114 to the station 2202B instead of waiting on the station 2202A.

The throughput loop 2208 can be connected with the primary loop 2204 by an external switch 2126A of the switches 2126. This external switch 2126A can be controlled by the controller 2112 to direct carriages 2114 traveling in the primary loop 2204 to enter into the sub-loop 2212 of the throughput loop 2208. Alternatively, the controller 2112 can control the external switch 2126A to direct the carriages 2114 past the throughput loop 2208 (e.g., the carriages continue on the route without turning to the right and down in the magnified view 2210). For example, a carriage moving in a rightward direction in the magnified view 2210 and into or through the external switch 2126A may be directed by the external switch 2126A to the right and downward in the magnified view 2210 of FIG. 22 to enter the first sub-loop 2212 of the throughput loop 2208.

The carriage 2114 may then reach an internal switch 2126B of the switches 2126 that is inside the throughput loop 2208 and that provides an intersection between the sub-loops 2212, 2214 of the throughput loop 2208. The controller can change the state of the internal switch 2126B to direct the carriage 2114 passing through or over the switch 2126B to remain in the first sub-loop 2212 and travel to the station 2202A or to exit the first sub-loop 2212 to enter into the second sub-loop 2214. If the switch 2126B directs the carriage 2114 to remain in the first sub-loop 2212, then the carriage 2114 may move to the station 2202A, where the operation performed by the station 2202A is completed. The carriage 2114 can exit the station 2202A, travel to the external switch 2126A, through the external switch 2126A, and back onto the primary loop 2204 (e.g., for movement toward one or more secondary loops 2208 and/or stations 2202).

But, if the internal switch 2126B directs the carriage 2114 to exit the first sub-loop 2212 and enter into the second sub-loop 2214, then the carriage 2114 may move to the station 2202B, where the operation performed by the station 2202B is completed. The carriage 2114 can exit the station 2202B, travel to another external switch 2126C that connects the throughput secondary loop 2208 with the primary loop 2204, and return to the primary loop 2204 through this additional external switch 2126C (e.g., for movement toward one or more secondary loops 2208 and/or stations 2202).

The controller 2112 can use throughput secondary loops 2208 to alternate between which stations 2202 perform operations on the carriages 2114. This can allow for carriages 2114 to bypass a backed up station 2202 and instead move to another station 2202 for completion of the operation(s).

Figure 23:
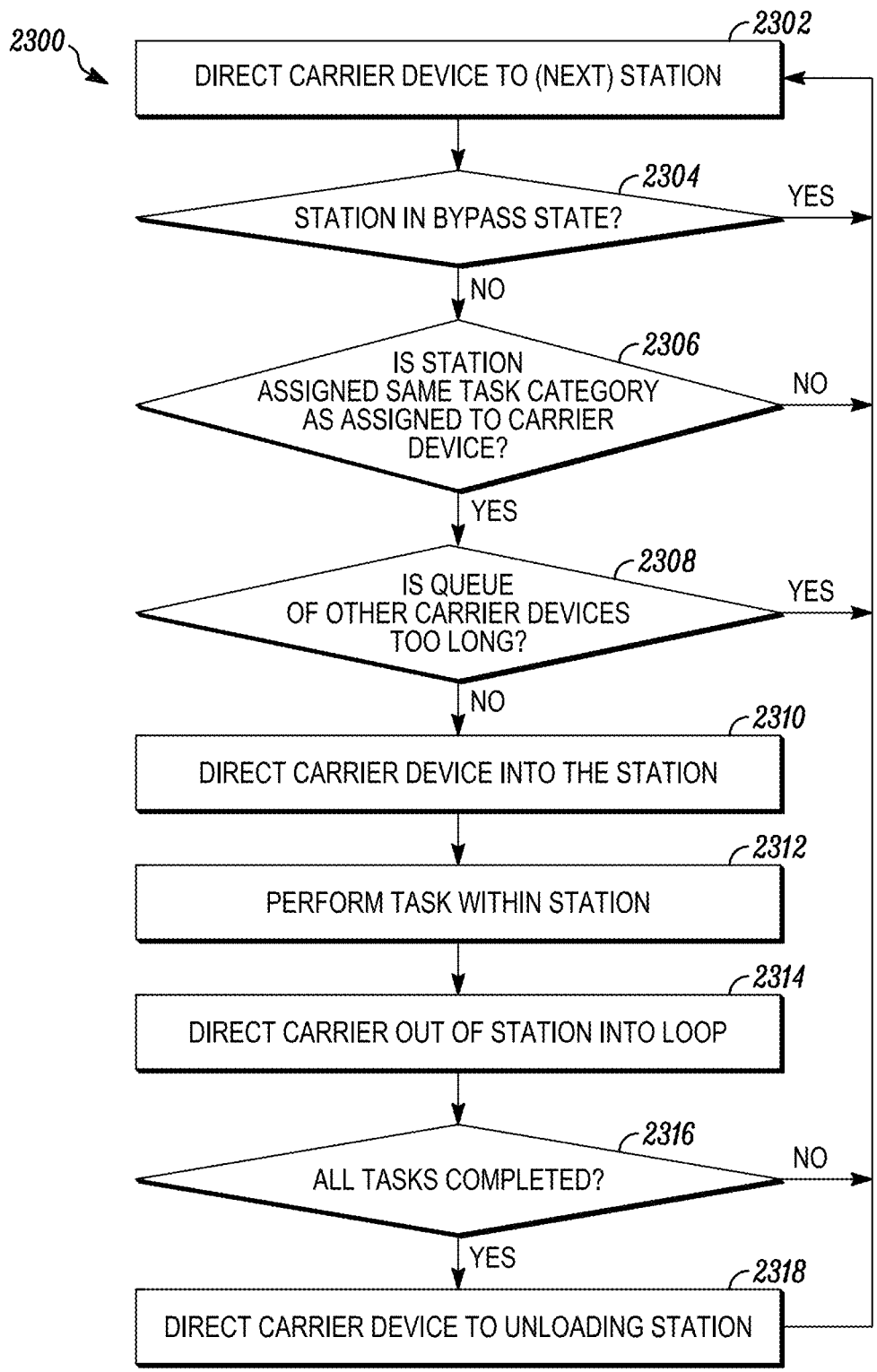
FIG. 23 illustrates a flowchart of one example of a method for packing a container with product and optional components, with use of re-assignable station tasks.

FIG. 23 illustrates a flowchart of one example of a method 2300 for packing a container with product and optional components, with use of re-assignable station tasks. The method can represent one example of the operations performed by the packing system shown in FIG. 1. At 2302, a carrier device moves to a station. The carrier device can move to the entrance of the station (e.g., the switch to the off-ramp for each station), stop within a communication range (e.g., line-of-sight) of the communication device associated with the entrance of that station, and communicate (or receive a communication from) the system controller via the communication devices before entering the station. This communication can include one or more instructions.

The instructions can direct a carrier device where to move to next in the packing system. For example, the instructions may direct the carrier device to move to the next switch along the single direction of travel through the routes, to move into a station from a switch, etc.

At 2304, a decision is made as to whether the station is in the bypass state. The system controller can determine whether the carrier device can or is to enter the station via the off-ramp or bypass the station on the loop for another station. For example, if the carrier device is outside of the first insert loading station 104A and the system controller determines that the carrier device is to head to a product loading station 106, then the system controller can direct the switch to change to the bypass state and can direct the device controller move the carrier device (e.g., the motor(s) of the carrier device) along the loop part of the route to the next station (e.g., the first product loading station 106A), such as shown in the return of the method from 2304 to 2302 in the flowchart. Alternatively, if the station is not in the bypass state, then the system controller can direct the carrier device to enter the station for performance of the task (depending on the length of a queue). As a result, this progression is represented by 2304 to 2306 in the flowchart.

At 2306, a decision of whether the task category assigned to the station is the same as the task assigned to the carrier device. The carrier device may stop moving before reaching the switch associated with the next station (e.g., the first product loading station). The system controller communicates with the device controller (e.g., via the communication device upstream of the first product loading station) to obtain one or more of the indicators described above. In this example, the system controller may direct the carrier device to enter into the first product loading station. As a result, flow of the method can progress from 2306 to 2308. But if the station is not the correct station (e.g., is not the same category of task as the task that needs to be completed with the container carried by the carrier device), then flow of the method can return to 2302. This can allow the system controller to direct the carrier device to move to the next available station that is the performing the correct category of tasks.

At 2308, a decision of whether a queue is too long. This queue may be examined for a single station, for multiple stations, and/or across the entire system. For example, the system controller can track locations of the carrier devices and determine that too many other carrier devices are waiting (in the station or outside of the station) for the task to be completed by the station(s). Consequently, the system controller can direct the carrier device to proceed to the next station and progress of the method can return toward 2302. The system controller can change or keep the state of the switch of the first product loading station in the bypass state. The carrier device may then move to the next station and the system controller can repeat this process (e.g., 2302, 2304, 2306, 2308). As another example, instead of just looking at the queue at each station, the system can work to equalize the number of carrier devices in-flight to stations and at the stations of the same type. A carrier device may be in-flight to a station that has received a destination assignment from one of the switches 2126 but that has not yet been processed by that station. This may include carrier devices moving toward stations, as well as those carrier devices already there in queue waiting to be processed.

As one example, stations 2108A, 2108D may be the same type of station (e.g., performing the same task on carrier devices). The station 2108D may be farther away from the initial distribution point (e.g., the loading station 2102), so the system controller can operate responsive to identifying a backup of carrier devices by sending more carrier devices to the station 2108D (relative to the station 2108A) since the queue at the farther station 2108D is lower or likely to be lower than the closer station 2108A (e.g., closer to the loading station 2102). But by the time the carrier devices may have arrived at the closer station 2108A, these carrier devices may already have been instructed to move toward the farther station 2108D. This can cause the queue of carrier devices waiting to be processed by the closer station 2108A to become shorter or eliminated (while the queue for the farther station 2108D may become longer or be created). The next group or wave of carrier devices can then be directed to the closer station 2108A to allow the queue at the father station 2108D to become shorter or be eliminated. By equalizing the number of in-flight carrier devices in this way, the controller may balance the number of carrier devices sent to each station.

This also can help account or correct for differences in personnel speed (e.g., the speed at which different persons may complete the same task at different stations). For example, sending the same number of carrier devices to different stations performing the same task but with different operators can result in a first station having a slower performing operator at one station create a larger queue or backup than a faster performing operator at another station. By sending different groups or waves of carrier devices to different stations, this queue or backup problem may be eliminated or avoided. In an example embodiment, the carrier devices move singly and independently along the pathway either bypassing the stations or entering the stations as needed based on the stored status of the order (e.g., by the system controller) being conveyed by the carrier device.

The system controller can determine whether the second product loading station 106B is the correct category of station (yes, it is the correct category) and whether the number of other carrier devices waiting on the second product loading station exceeds the threshold. If the number of other carrier devices waiting on the second product loading station does not exceed the threshold, the system controller (at 2310) can direct the carrier device to move into the station (e.g., by maintaining or changing the state of the switch to the incoming state to allow the device controller to move the carrier device into the station).

But if the station is the incorrect category of tasks or the number of other carrier devices waiting on the station exceeds the threshold, the system controller can direct the carrier device to continue moving on the loop part of the route to the next station. The system controller can repeat this process until a station that is the correct task category and does not have too many other carrier devices waiting on task completion, even if this requires the carrier device to move completely around the loop part of the routes one or more times before finding such a station.

As described above, the tasks performed by the variable stations can change. The system controller can determine which task is currently being performed by a variable station and use this information to direct carrier devices to the variable stations, as applicable or appropriate. If the currently assigned task of a variable station matches the task to be completed or assigned to the carrier device (and the queue of other carrier devices waiting in that variable station is not too long), then the system controller can direct the carrier device to enter into the variable station to have the task performed (as described above). Providing the ability to change which tasks are performed by the variable stations can allow for the total number of stations performing the same task to increase in response to the queues of carrier devices at these stations becoming too long (forming bottlenecks or backlogs). This can increase or maintain throughput of the packing system.

At 2312, the task is performed at the station. As described above, this can involve placing a container on or in a carrier device, loading packing materials or ancillary devices or medication (e.g. product) into the container, placing literature into the container, checking the contents of the container, re-working or correcting the contents in a container, etc. Once the task is complete at a station, the system controller can change the state of the switch to the outgoing state and direct the carrier device to leave the station and return to the loop to move to the next station at 2314.

At 2316, a decision of whether all tasks (including review and re-work) have been completed for the container on that carrier device. The system controller can determine when all tasks are completed and direct the carrier device to the unloading station (at 2318) for unloading of the container. The method may then return to another operation (e.g., 2302) for the process to being again. Alternatively, the method may terminate. But if one or more tasks remain, the method can return to 2302 following 2316 to direct the carrier device to another station for performance of another task (e.g., using 2302, 2304, 2306, 2308, 2310, 2312).

Once all tasks are complete for a container carried by or in a carrier device, the system controller can instruct the device controller to move to the unloading station (e.g., at 2318), where the assigned task of removing the container from the carrier device is performed. This task may occur automatically with robotic machines or manually. The carrier device can then move to the container loading station for receiving another container to repeat the process (e.g., at 2302).

The present disclosure uses the term message and/or signal for describing communication over a secondary communication channel to and from the provider devices. In an example embodiment, the message is not an audio signal. In an example embodiment, the message is not a video signal. Messages can be SMS text messages in an example embodiment. The messages can be packets including a header (including sender device and recipient device identification data) and a body of data. The use of a packet for communication on the second channel can allow for the packet to require less bandwidth to route the information to and from the provider device. Routing the packets can use internet protocol (e.g., IPv4, IPv6 and the like) to transmit the packets. The packet replies from the provider device can be a selection reply, e.g., a single character, that in and of itself does not provide any protected or sensitive information and can be interpreted by the telehealth system.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, present disclosure may lie in less than all features of a single disclosed embodiment. Thus, the following claims are hereby incorporated into the Detailed Description, with each claim standing on its own as a separate embodiment.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims is intended to be a means-plus-function element within the meaning of 35 U.S.C. § 112(f) unless an element is expressly recited using the phrase "means for," or in the case of a method claim using the phrases "operation for" or "step for."

The methods described herein do not have to be executed in the order described, or in any particular order. Moreover, various activities described with respect to the methods identified herein can be executed in serial or parallel fashion. Although "End" blocks may be shown in the flowcharts, the methods may be performed continuously.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, present disclosure may lie in less than all features of a single disclosed embodiment. Thus, the following claims are hereby incorporated into the Detailed Description, with each claim standing on its own as a separate embodiment.

What is claimed is:

1. A method for packaging products into containers, the method comprising:

directing carrier devices to move along tracks between stations where different tasks associated with packing the products into the containers carried by the carrier devices are performed, the tracks forming a primary loop and secondary loops with the secondary loops connected with the primary loop by switches, the stations disposed in the secondary loops and connected with the primary loop by the switches, the carrier devices including carriages having platforms on which the containers are carried, the stations including an insert station having a robotic insert transporter with a first multi-axis robot arm that performs the task of placing inserts into the containers for forming one or more compartments within the containers, a syringe station having a robotic syringe transporter with a second multi-axis robot arm that performs the task of placing syringes into the containers, a dosing cup station having a robotic dosing cup transporter with a third multi-axis robot arm that performs the task of placing dosing cups into the containers, and an unloading station having a robotic box transporter with a fourth multi-axis robot arm that performs the task of removing the containers from the carriages;

determining whether a first carrier device of the carrier devices is at a first station of the stations that is assigned to a same task category as a first task that is assigned to the first carrier device and determining whether a queue of other carrier devices of the carrier devices waiting in the first station for completion of the first task is longer than a designated threshold, the designated threshold being (a) a queue length threshold indicative of a number of the carrier devices waiting for performance of the task at the first station or (b) a throughput threshold indicative of a rate, speed, or frequency at which the carrier devices move through the first station;

responsive to determining that the first station is assigned to the same task category as the first task and that the queue of the first station is no longer than the designated threshold, sending a signal to one or more of the switches to change a position of the one or more switches and direct the first carrier device into the first station via the one or more of the switches for performance of the first task;

assigning an additional task to the first carrier device and directing the first carrier out of the first station and to an additional station of the stations;

determining whether the additional station is assigned to the same task category as the additional task and determining whether the queue of the other carrier devices waiting in the additional station for completion of the additional task is longer than the designated threshold;

responsive to determining that the additional station is assigned to the same task category as the additional task and that the queue of the additional station is no longer than the designated threshold, directing the first carrier device into the additional station for performance of the additional task;

repeating assigning the additional task, determining whether the additional station is assigned to the same task category as the additional task, determining whether the queue of the other carrier devices waiting in the additional station for completion of the additional task is longer than the designated threshold, and directing the first carrier device into the additional station for performance of the additional task responsive to determining that the additional station is assigned to the same task category as the additional task and that the queue of the additional station is no longer than the designated threshold until a set of tasks associated with the first carrier device is completed, wherein the category of tasks completed by the at least one of the stations is changeable between two or more of inspecting contents of the container carried by the first carrier device, correcting the contents in the container carried by the first carrier device, or placing the contents inside the container carried by the first carrier device, wherein the tasks assigned to the at least one of the stations that are changeable are automatically performed by robotic machinery;

determining whether a rate, speed, or frequency at which the carrier devices move through the first station is slower than a throughput threshold; and directing one or more additional carrier devices to bypass the first station and move to a second station responsive to determining that the rate, the speed, or the frequency at which the carrier devices move through the first station is slower than the throughput threshold.

2. The method of claim 1, wherein the category of tasks completed by at least one of the stations is configurable between different ones of the tasks.

3. The method of claim 1, further comprising:
responsive to determining (a) that the first station or the additional station is assigned to a different task category as the corresponding first task or the additional task or (b) the queue of the first station or the additional station is longer than the designated threshold, controlling the one or more switches to direct the first carrier device to bypass the corresponding first station or the additional station and move to another station of the stations.

4. The method of claim 1, wherein the tasks assigned to the at least one of the stations that are changeable are manually performed.

5. A method for packaging products into containers, the method comprising:
directing carrier devices to move along tracks between stations where different tasks associated with packing the products into the containers carried by the carrier devices are performed, the tracks forming a primary loop and secondary loops with the secondary loops connected with the primary loop by switches, the stations disposed in the secondary loops and connected with the primary loop by the switches, the carrier devices including carriages having platforms on which the containers are carried, the stations including an insert station having a robotic insert transporter with a first multi-axis robot arm that performs the task of placing inserts into the containers for forming one or more compartments within the containers, a syringe station having a robotic syringe transporter with a second multi-axis robot arm that performs the task of placing syringes into the containers, a dosing cup station having a robotic dosing cup transporter with a third multi-axis robot arm that performs the task of placing dosing cups into the containers, and an unloading station having a robotic box transporter with a fourth multi-axis robot arm that performs the task of removing the containers from the carriages;

determining whether a first carrier device of the carrier devices is at a first station of the stations that is assigned to a same task category as a first task that is assigned to the first carrier device and determining whether a queue of other carrier devices of the carrier devices waiting in the first station for completion of the first task is longer than a designated threshold, the designated threshold being (a) a queue length threshold indicative of a number of the carrier devices waiting for performance of the task at the first station or (b) a throughput threshold indicative of a rate, speed, or frequency at which the carrier devices move through the first station;

responsive to determining that the first station is assigned to the same task category as the first task and that the queue of the first station is no longer than the designated threshold, sending a signal to one or more of the switches to change a position of the one or more switches and direct the first carrier device into the first station via the one or more of the switches for performance of the first task;

responsive to determining (c) that the first station or an additional station is assigned to a different task category as the corresponding first task or an additional task or (d) the queue of the first station or the additional station is longer than the designated threshold, directing the first carrier device to bypass the corresponding first station or the additional station and move to another station of the stations, wherein the category of tasks completed by the at least one of the stations is changeable between two or more of inspecting contents of the container carried by the first carrier device, correcting the contents in the container carried by the first carrier device, or placing the contents inside the container carried by the first carrier device;

determining whether a rate, speed, or frequency at which the carrier devices move through the first station is slower than a throughput threshold; and directing one or more additional carrier devices to bypass the first station and move to a second station responsive to determining that the rate, the speed, or the frequency at which the carrier devices move through the first station is slower than the throughput threshold.

6. The method of claim 5, further comprising:

assigning an additional task to the first carrier device and directing the first carrier out of the first station and to an additional station of the stations.

7. The method of claim 6, further comprising:

determining whether the additional station is assigned to the same task category as the additional task and determining whether the queue of the other carrier devices waiting in the additional station for completion of the additional task is longer than the designated threshold; and responsive to determining that the additional station is assigned to the same task category as the additional task and that the queue of the additional station is no longer than the designated threshold, directing the first carrier device into the additional station for performance of the additional task.

8. The method of claim 7, further comprising:

repeating assigning the additional task, determining whether the additional station is assigned to the same task category as the additional task, determining whether the queue of the other carrier devices waiting in the additional station for completion of the additional task is longer than the designated threshold, and directing the first carrier device into the additional station for performance of the additional task responsive to determining that the additional station is assigned to the same task category as the additional task and that the queue of the additional station is no longer than the designated threshold until a set of tasks associated with the first carrier device is completed.

9. The method of claim 5, wherein the category of tasks completed by at least one of the stations is configurable between different ones of the tasks.

10. The method of claim 5, wherein the tasks assigned to the at least one of the stations that are changeable are manually performed.

11. The method of claim 5, wherein the tasks assigned to the at least one of the stations that are changeable are automatically performed by robotic machinery.

\* \* \* \* \*